US012435813B2

(12) United States Patent
Forughi et al.

(10) Patent No.: US 12,435,813 B2
(45) Date of Patent: Oct. 7, 2025

(54) MINIATURIZED HYDRAULIC VALVE, AND APPLICATIONS THEREOF IN ROBOT SYSTEMS

(71) Applicant: Sanctuary Cognitive Systems Corporation, Vancouver (CA)

(72) Inventors: Amir Farzad Forughi, Vancouver (CA); Can Ozdemir, Vancouver (CA); James Hao Guan Quek, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 139 days.

(21) Appl. No.: 18/525,697

(22) Filed: Nov. 30, 2023

(65) Prior Publication Data

US 2024/0175516 A1   May 30, 2024

Related U.S. Application Data

(60) Provisional application No. 63/428,997, filed on Nov. 30, 2022.

(51) Int. Cl.
  *F16K 31/42*   (2006.01)
  *B25J 9/14*   (2006.01)
  (Continued)

(52) U.S. Cl.
  CPC .............. *F16K 31/42* (2013.01); *B25J 9/14* (2013.01); *F16K 31/007* (2013.01); *F16K 99/0048* (2013.01); *Y10T 137/87209* (2015.04)

(58) Field of Classification Search
  CPC ...... B25J 9/14; F16K 31/124; F16K 31/1245; F16K 31/128; F16K 31/52;
  (Continued)

(56) References Cited

U.S. PATENT DOCUMENTS 3,805,837 A * 4/1974 Stampfli ............... F16K 11/048
                                            137/625.6
4,284,263 A * 8/1981 Newcomb ............ F02M 61/167
                                            251/368
(Continued)

FOREIGN PATENT DOCUMENTS

WO        0225153 A2     3/2002

OTHER PUBLICATIONS

Notification of Transmittal of the International Search Report and the Written Opinion of the International Searching Authority, or the Declaration, International Application No. PCT/CA2023/051601 (Feb. 14, 2024).

*Primary Examiner* — Kenneth Rinehart
*Assistant Examiner* — Jonathan J. Waddy
(74) *Attorney, Agent, or Firm* — Adenike Adebiyi; Thomas Mahon

(57) ABSTRACT

An electrohydraulic valve includes a valve housing having a common chamber and a metering port in communication with the common chamber. The valve housing is coupled to a valve manifold having an inlet port and an outlet port. A first nozzle in fluid communication with the inlet port has a first orifice. A second nozzle in fluid communication with the outlet port has a second orifice. A first valve disposed within the common chamber is operable to move the first valve between a closed position where the first valve closes the first orifice and an open position where the first valve opens the first orifice. A second valve disposed within the common chamber is operable to move the second valve between a closed position where the second valve closes the second orifice and an open position where the second valve opens the second orifice.

16 Claims, 28 Drawing Sheets

(51) Int. Cl.
*F16K 31/00* (2006.01)
*F16K 99/00* (2006.01)

(58) Field of Classification Search
CPC ....... F16K 99/0048; F16K 31/004–008; F16K 31/42; F16K 31/423; F16K 31/426; Y10T 137/86614; Y10T 137/87209; F15B 13/04; F15B 13/044; F15B 13/085
USPC ........ 137/596.16, 625.64; 251/30.01, 129.18
See application file for complete search history.

(56) References Cited

U.S. PATENT DOCUMENTS

| | | | | |
|---|---|---|---|---|
| 4,432,391 A * | 2/1984 | Ott | ........................ | F16K 31/426 137/625.6 |
| 4,638,837 A * | 1/1987 | Buike | ...................... | B62D 5/06 251/129.05 |
| 5,042,775 A * | 8/1991 | Willemsen | ............ | F16K 31/402 222/14 |
| 5,881,767 A | 3/1999 | Loser | | |
| 6,484,754 B1 | 11/2002 | Muth et al. | | |
| 6,502,803 B1 * | 1/2003 | Mattes | ................. | F02M 47/027 251/282 |
| 7,044,431 B2 * | 5/2006 | Stumpe | ................ | F16K 31/402 251/30.01 |
| 7,520,487 B2 | 4/2009 | Mattes | | |
| 7,798,174 B2 | 9/2010 | Ford et al. | | |
| 7,849,870 B2 | 12/2010 | DuPuis et al. | | |
| 9,091,368 B2 | 7/2015 | Scheibe et al. | | |
| 11,927,281 B1 * | 3/2024 | Huff | .................... | F16K 99/0015 |
| 2003/0234051 A1 * | 12/2003 | Toivonen | ............... | F16K 31/402 137/554 |
| 2005/0127316 A1 * | 6/2005 | Pauer | ................. | F02M 63/0015 251/129.18 |
| 2012/0186657 A1 * | 7/2012 | Rosenthal | ............. | F16K 31/004 251/129.01 |
| 2013/0000758 A1 * | 1/2013 | Hoen | .................... | F04B 43/046 137/565.01 |
| 2013/0000759 A1 * | 1/2013 | Killeen | ............... | F16K 99/0015 251/129.01 |
| 2013/0001453 A1 * | 1/2013 | Hirose | ................. | F16K 31/1226 251/285 |
| 2015/0114499 A1 * | 4/2015 | Dohi | ........................ | F16K 7/16 137/613 |
| 2016/0341330 A1 * | 11/2016 | Sneh | .................... | G05D 7/0113 |
| 2016/0377192 A1 * | 12/2016 | Renollett | .............. | F16K 31/42 251/30.01 |
| 2018/0003312 A1 * | 1/2018 | Schupp | ................. | F16K 31/004 |
| 2018/0240961 A1 * | 8/2018 | Shigyou | ............... | F16K 31/007 |
| 2022/0372997 A1 * | 11/2022 | Niefer | ................ | F15B 13/0896 |
| 2022/0406987 A1 | 12/2022 | Wu | | |

* cited by examiner

MINIATURIZED HYDRAULIC VALVE, AND APPLICATIONS THEREOF IN ROBOT SYSTEMS

CROSS-REFERENCES TO RELATED APPLICATIONS

This application claims the benefit of U.S. Provisional Application No. 63/428997, filed Nov. 30, 2022, the content of which is incorporated herein by reference.

FIELD

The present systems, devices, and methods generally relate to hydraulic valves, and particularly relate to miniaturized hydraulic valves for hydraulically-actuated robotic components.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input and can be operated by humans. Other robots have a degree of autonomy and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Hydraulics is a technology involving mechanical properties and use of liquids, which is based on a theoretical foundation provided by fluid mechanics. In fluid power applications, hydraulics can be used for the generation, control, transmission, and distribution of power. In robotic applications, hydraulics can be used, alone or in combination with electric motors and other power sources, to distribute power to a robot's components, e.g., actuators.

Hydraulic systems can include one or more hydraulic valves. A hydraulic valve can control a flow of hydraulic fluid in a hydraulic system. Some hydraulic valves control the flow of hydraulic fluid by opening or closing the valve. Some hydraulic valves control the flow of hydraulic fluid by continuously regulating the flow. Hydraulic valves can be actuated, for example, by a handle, knob or cam, or can be solenoid-operated or pilot-operated.

A directional control valve can pause and restart a flow of hydraulic fluid, and/or change a direction of flow. An example of a directional control valve is a two-way directional control valve comprising two ports referred to as an inlet and an outlet.

A pressure control valve can regulate a pressure of a hydraulic fluid in a hydraulic system, for example by releasing an excess pressure.

A flow control valve can be used to improve hydraulic system performance by adjusting a flow of a hydraulic fluid through the hydraulic system.

SUMMARY

In a representative example, a miniaturized hydraulic valve can include a valve body having an inlet and an outlet; a fluid path through the valve body, the fluid path able to hydraulically couple the inlet to the outlet, the fluid path comprising a nozzle having a diameter in a first range of 600 micrometers to 700 micrometers; a plunger positioned in the fluid path proximate the nozzle; and a piezoelectric material mechanically coupled to the plunger, a position of the plunger relative to the nozzle dependent on at least one dimension of the piezoelectric material, the at least one dimension of the piezoelectric material responsive to one or more electrical signals from an electrical system. When in operation the electrical system provides no electrical power to the piezoelectric material, the plunger is urged against the nozzle to interrupt a flow of a hydraulic fluid along the fluid path, the urging sufficient to interrupt flow at a fluid pressure of at least 700 pounds per square inch (psi). When in operation the electrical system provides an electrical power to the piezoelectric material, the plunger is displaced from the nozzle to form a gap between the plunger and the nozzle to allow the flow of the hydraulic fluid along the fluid path, the gap proportional to the electrical power provided to the piezoelectric material, the plunger displacement in a second range of 40 micrometers to 70 micrometers, the gap sufficient to accommodate a flow rate of the hydraulic fluid of up to 0.5 liters per minute (LPM).

In another representative example, a hydraulic system can include a miniaturized hydraulic valve, the miniaturized hydraulic valve comprising a valve body, the valve body comprising an inlet and an outlet; a fluid path through the valve body, the fluid path able to hydraulically communicatively couple the inlet to the outlet, the fluid path comprising a nozzle having a diameter in a first range of 600 micrometers to 700 micrometers; a plunger positioned in the fluid path proximate the nozzle; and a piezoelectric material mechanically communicatively coupled to the plunger. The hydraulic system can further include an electrical system electrically coupled to the piezoelectric material, at least one dimension of the piezoelectric material responsive to one or more electrical signals from the electrical system and a position of the plunger relative to the nozzle dependent on the at least one dimension of the piezoelectric material. When in operation the electrical system provides no electrical power to the piezoelectric material, the plunger is urged against the nozzle to interrupt a flow of a hydraulic fluid along the fluid path, the urging sufficient to interrupt flow at a fluid pressure of at least 700 pounds per square inch (psi). When in operation the electrical system provides an electrical power to the piezoelectric material, the plunger is displaced from the nozzle to form a gap between the plunger and the nozzle to allow the flow of the hydraulic fluid along the fluid path, the gap proportional to the electrical power provided to the piezoelectric material, the plunger displacement in a second range of 40 micrometers to 70 micrometers, the gap sufficient to accommodate a flow rate of the hydraulic fluid of up to 0.5 liters per minute (LPM).

In another representative example, a robotic arm can include a hydraulic control system physically coupled to the robot body; a hydraulically-actuated component physically coupled to the robot body, the hydraulically-actuated component operable to cause a motion of at least a portion of the robot; and a hydraulic assembly comprising a miniaturized hydraulic valve, which can include a valve body, the valve body comprising an inlet and an outlet; a fluid path through the valve body, the fluid path able to hydraulically couple the inlet to the outlet, the fluid path comprising a nozzle having a diameter in a first range of 600 micrometers to 700 micrometers; a plunger positioned in the fluid path proximate the nozzle; and a piezoelectric material mechanically communicatively coupled to the plunger. The hydraulic assembly can further include an electrical system electrically coupled to the piezoelectric material, at least one dimension of the piezoelectric material responsive to one or more electrical signals from the electrical system and a position of the plunger relative to the nozzle dependent on the at least one dimension of the piezoelectric material. When in operation the electrical system provides no electrical power to the piezoelectric material, the plunger is urged against the nozzle to interrupt a flow of a hydraulic fluid along the fluid path, the urging sufficient to interrupt flow at a fluid pressure of at least 700 pounds per square inch (psi). When in operation the electrical system provides an electrical power to the piezoelectric material, the plunger is displaced from the nozzle to form a gap between the plunger and the nozzle to allow the flow of the hydraulic fluid along the fluid path, the gap proportional to the electrical power provided to the piezoelectric material, the plunger displacement in a second range of 40 micrometers to 70 micrometers, the gap sufficient to accommodate a flow rate of the hydraulic fluid of up to 0.5 liters per minute (LPM).

In another representative example, a robot can include a robot body; a hydraulic control system physically coupled to the robot body; a hydraulically-actuated component physically coupled to the robot body, the hydraulically-actuated component operable to cause a motion of at least a portion of the robot; and a hydraulic assembly comprising a miniaturized hydraulic valve, which can include a valve body, the valve body comprising an inlet and an outlet; a fluid path through the valve body, the fluid path able to hydraulically couple the inlet to the outlet, the fluid path comprising a nozzle having a diameter in a first range of 600 micrometers to 700 micrometers; a plunger positioned in the fluid path proximate the nozzle; and a piezoelectric material mechanically coupled to the plunger. The hydraulic assembly can further include an electrical system electrically coupled to the piezoelectric material, at least one dimension of the piezoelectric material responsive to one or more electrical signals from the electrical system and a position of the plunger relative to the nozzle dependent on the at least one dimension of the piezoelectric material. When in operation the electrical system provides no electrical power to the piezoelectric material, the plunger is urged against the nozzle to interrupt a flow of a hydraulic fluid along the fluid path, the urging sufficient to interrupt flow at a fluid pressure of at least 700 pounds per square inch (psi). When in operation the electrical system provides an electrical power to the piezoelectric material, the plunger is displaced from the nozzle to form a gap between the plunger and the nozzle to allow the flow of the hydraulic fluid along the fluid path, the gap proportional to the electrical power provided to the piezoelectric material, the plunger displacement in a second range of 40 micrometers to 70 micrometers, the gap sufficient to accommodate a flow rate of the hydraulic fluid of up to 0.5 liters per minute (LPM).

In another representative example, an electrohydraulic valve includes a valve manifold having an inlet port and an outlet port; a valve housing having a common chamber defined therein, a metering port in communication with the common chamber, and a first end coupled to the valve manifold; a first nozzle in fluid communication with the inlet port, the first nozzle having a first nozzle tip portion disposed within the common chamber, the first nozzle tip portion including a first orifice; a second nozzle in fluid communication with the outlet port, the second nozzle having a second nozzle tip portion disposed within the common chamber, the second nozzle tip portion including a second orifice; a first valve plug disposed within the common chamber and positioned in opposing relation to the first orifice; a first valve actuator coupled to the first valve plug and operable to move the first valve plug between a closed position in which the first valve plug contacts the first nozzle tip portion and closes the first orifice and an open position in which the first valve plug is offset from the first nozzle tip portion and a first gap is created between the first valve plug and the first orifice for passage of fluid from the first orifice to the common chamber; a second valve plug disposed within the common chamber and positioned in opposing relation to the second orifice; and a second valve actuator coupled to the second valve plug and operable to move the second valve plug between a closed position in which the second valve plug contacts the second nozzle tip portion and closes the second orifice and an open position in which the second valve plug is offset from the second nozzle tip portion and a second gap is created between the second valve plug and the second orifice for passage of fluid from the common chamber to the second orifice.

In another representative example, a method of operating a hydraulic actuator includes applying an electrical field to a first valve actuator disposed within a common chamber of a valve unit to axially displace a first valve plug disposed within the common chamber from a first orifice connected to an inlet port of a valve manifold and form a first communication path between the inlet port and the common chamber through the first orifice; delivering fluid to the common chamber through the first communication path from a fluid source connected to the inlet port; delivering the fluid from the common chamber to a hydraulic actuator through a metering port of the valve unit; removing the electrical field from the first valve actuator to bias the first valve plug against the first orifice and close the first communication path; applying an electrical field to a second valve actuator disposed within the common chamber of the valve unit to axially displace a second valve plug disposed within the common chamber from a second orifice connected to an outlet port of the valve manifold and form a second communication path between the outlet port and the common chamber through the second orifice; and exhausting fluid from the common chamber through the second communication path to a fluid return connected to the outlet port.

BRIEF DESCRIPTION OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
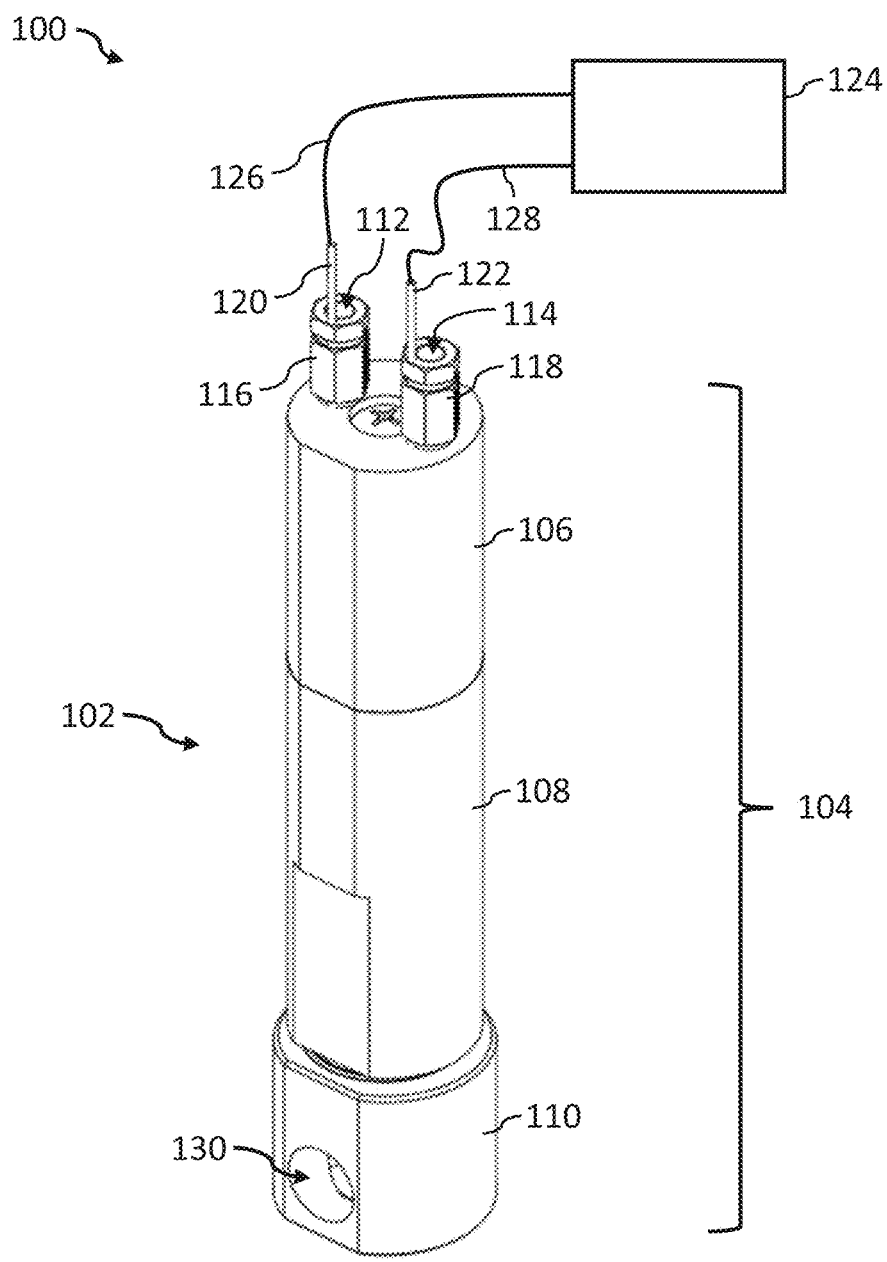
FIG. 1 is a perspective view of an example implementation of a direct piezoelectric hydraulic valve, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The technology described in the present application includes systems, devices, and methods for hydraulically-powered robots. In particular, the present application describes hydraulic valves suitable for use in a hydraulic system (e.g., a hydraulic system used in a hydraulically-powered robot). The hydraulic valves may be miniaturized hydraulic valves.

In some applications of robotic systems in general, and humanoid robots in particular, it can be desirable for end effectors to have sufficient power and precision, while fitting within a certain form factor. It can also be desirable for couplings (e.g., cables, hoses, wires, etc.) between end effectors and other components of the robotic system to be at least partially internal to the robot. External couplings can be unsightly, and can increase the external dimensions of the robot making it more difficult for the robot to operate in restricted spaces. External couplings can also be a hazard, and may cause damage to the robot, or the robot's environment, if the couplings snag on an object in the robot's environment, for example.

The technology described in the present application includes hydraulic valves for hydraulic applications including but not limited to hydraulic systems providing power in a robotic system. For example, valves can be used in a hydraulic system providing power to an end effector of a robotic system (e.g., to a hand of a humanoid robot), wherein some or all of the hydraulic system is adapted and/or miniaturized to fit at least partially inside the robot (e.g., inside a robotic arm).

In some implementations, at least a portion of the hydraulic system (e.g., at least one hydraulic hose) is routed through a pivot joint (e.g., a shoulder, an elbow, a forearm, a wrist and/or a knuckle of the robotic arm). A pivot joint can be an example of a restricted space. A restricted space may be restricted in volume, for example. A restricted space may include moving components that can interfere with hydraulic hoses in the space and/or hydraulic hoses traversing the space, as well as other hydraulic fittings and components in the space or traversing the space. A restricted space may have a volume and/or a shape that can change during operation, e.g., when the robot is in motion or executing a task. In restricted spaces in general, and pivot joints as an example, it can be advantageous for hydraulic fittings to be more compact. It may also be advantageous for hydraulic hoses and fittings (e.g., hydraulic valves) to have smaller dimensions in restricted spaces.

The technology described in the present application includes miniaturized hydraulic valves for a hydraulic system. In some implementations, a hydraulic system is used to control an actuation of various degrees of freedom (DOF) of a robotic hand of a robot. As explained above, it can be desirable to miniaturize components of the hydraulic system (e.g., the hydraulic valves) so that at least some of the components can fit inside the robot's internal volume, and external hydraulic hoses can be eliminated, or at least reduced.

The technology described in the present application includes novel implementations of miniaturized piezoelectric poppet valves. A poppet valve can be used to control a timing and a quantity of hydraulic fluid flow to hydraulic devices in a hydraulic system. Poppet valves typically include a) a nozzle with an aperture, and b) a plunger that is pressed over the nozzle (or into the aperture) to close the valve and stop, or at least reduce, the flow of hydraulic fluid through the valve. Closing the valve is conventionally accomplished using a spring and/or a solenoid. Opening the valve is conventionally accomplished by compressing the spring or the solenoid to either push or pull the plunger away from the aperture to allow fluid to flow through the nozzle.

The present technology includes replacing the spring and/or solenoid by a piezoelectric material and using electrically controlled activation (expansion or contraction) of the piezoelectric material to open the aperture.

Performance of a hydraulic valve can vary with a viscosity of a hydraulic fluid flowing through the hydraulic valve. In some implementations, the hydraulic fluid is an oil. In some implementations, the peanut oil has a viscosity in a range of 60 centistokes to 80 centistokes.

In operation, a higher fluid pressure in a hydraulic fluid in a hydraulic system can provide more force to an end effector of a robotic system, e.g., to a robotic hand of a humanoid robot. In some implementations, it can be desirable for the fluid pressure in the hydraulic system to be at least 700 pounds per square inch (psi). In one implementation, the fluid pressure is 800 psi. A higher fluid pressure can cause more strain on components of the hydraulic system, e.g., the hydraulic valves. The present technology can accommodate fluid pressures that support implementations in robotic systems.

In operation, a flow rate of the hydraulic fluid in the hydraulic system can at least in part determine a speed with which an end effector can move. A higher flow rate usually means faster movement of the end effector. A higher flow rate can be harder to control. The present technology can accommodate fluid flow rates that support implementations in robotic systems. In some implementations, the fluid flow rate is less than 0.5 liters per minute (LPM). In one example implementation, the fluid flow rate is 0.2 LPM.

In some applications, it can be desirable for a hydraulic valve to operate efficiently at a high pressure and a low flow rate. In some robotic systems, for example, a fluid pressure in the robot's hydraulic system is more than 700 psi (pounds per square inch), and a flow rate of hydraulic fluid in the robot's hydraulic system is less than 0.4 lpm (liters per minute).

The miniaturized hydraulic valves described below are referred to in the present application as "high pressure, low flow rate" valves. The present technology combines operation at high fluid pressure (e.g., more than 700 psi) with operation at low fluid flow rate (e.g., less than 0.5 LPM).

In some implementations, there are about forty hydraulic valves located in the interior volume of each robotic arm. In some implementations of existing technology, the hydraulic valves are approximately 2 cm×2 cm×2 cm in size, which makes it challenging to fit forty hydraulic valves in the interior volume of each robotic arm. In some implementations of the present technology, the hydraulic valves are approximately 1 cm×1 cm×1 cm, and the hydraulic valves are arranged in a 2 cm×2 cm×10 cm rectangular block inside a forearm of each robotic arm.

It can be desirable for hydraulic valves to consume less power than existing technology. It can also be desirable for hydraulic valves to operate for more cycles than existing technology. It can also be desirable for hydraulic valves to consume no power in off state.

An object or shape is defined as humanoid when it has an appearance, or a character, resembling that of a human. For example, a humanoid robot is a robot having an appearance or a character resembling that of a human. A humanoid robot may be "humanoid" in its entirety or may have humanoid components (e.g., a torso, a head, arms, and hands) coupled to non-humanoid components (e.g., a wheeled base). While the following description focuses mainly on a hydraulically-powered humanoid robot, a person of skill in the art will appreciate that a hydraulic system in accordance with the present technology may be used to control a hand, a foot, a tail, a head, or any applicable end effector or actuator in a humanoid or non-humanoid robot.

Using hydraulics to drive a robotic arm and/or an end effector can be advantageous for reasons that include the following:

Hydraulics can provide high speed and strength within a humanoid envelope of shape and size.

To accommodate humanoid envelope constraints, components (e.g., a motor) can be located outside the envelope, or at least outside regions where volume is constrained, and hydraulically coupled to components inside the envelope. Components of a hydraulic system are said to be hydraulically coupled if the components are coupled by a hydraulic fluid.

Hydraulics can provide a high power density especially if the motor is outside the constrained volume.

Hydraulics can at least reduce hysteresis in motion. Hysteresis can manifest as a twitchiness in the movement of the robot. Since hydraulic fluid can be substantially incompressible, there can be little or no potential energy to be released at the moment the static coefficients of friction are exceeded.

Hydraulics can provide centralized power and thereby apply full power onto a single degree of freedom (DOF).

Hydraulics can provide high-fidelity control of the robot, i.e., high precision in the movement of the robot.

Hydraulic systems include hydraulic hoses to provide hydraulic coupling, and hydraulic fittings to secure hydraulic hoses to other hydraulic components, e.g., pumps, valves, and actuation pistons.

FIG. 1 is a perspective view of an example implementation of a hydraulic system 100 comprising a direct piezoelectric hydraulic valve 102, in accordance with the present systems, devices, and methods. Hydraulic valve 102 includes valve body 104. Valve body 104 includes three segments—upper body 106, central body 108, and lower body 110.

Upper body 106 includes openings 112 and 114, fittings 116 and 118, and electrical pins 120 and 122. Electrical pins 120 and 122 provide an electrical communicative coupling between piezoelectric hydraulic valve 102 and an electrical system 124 via electrical wires 126 and 128. Electrical system 124 is operable to provide electrical signals to control an expansion of piezoelectric material in piezoelectric hydraulic valve 102, as described with reference to FIGS. 2A and 2B below. Electrical system 124 may include a controller.

Lower body 110 includes a port 130. Port 130 may be an inlet or an outlet. In some implementations, valve body 104 includes a manifold (not shown in FIG. 1) with various additional ports that can be used as inlets, outlets, bleed lines, vents, electrical conduits and the like.

Figure 2A:
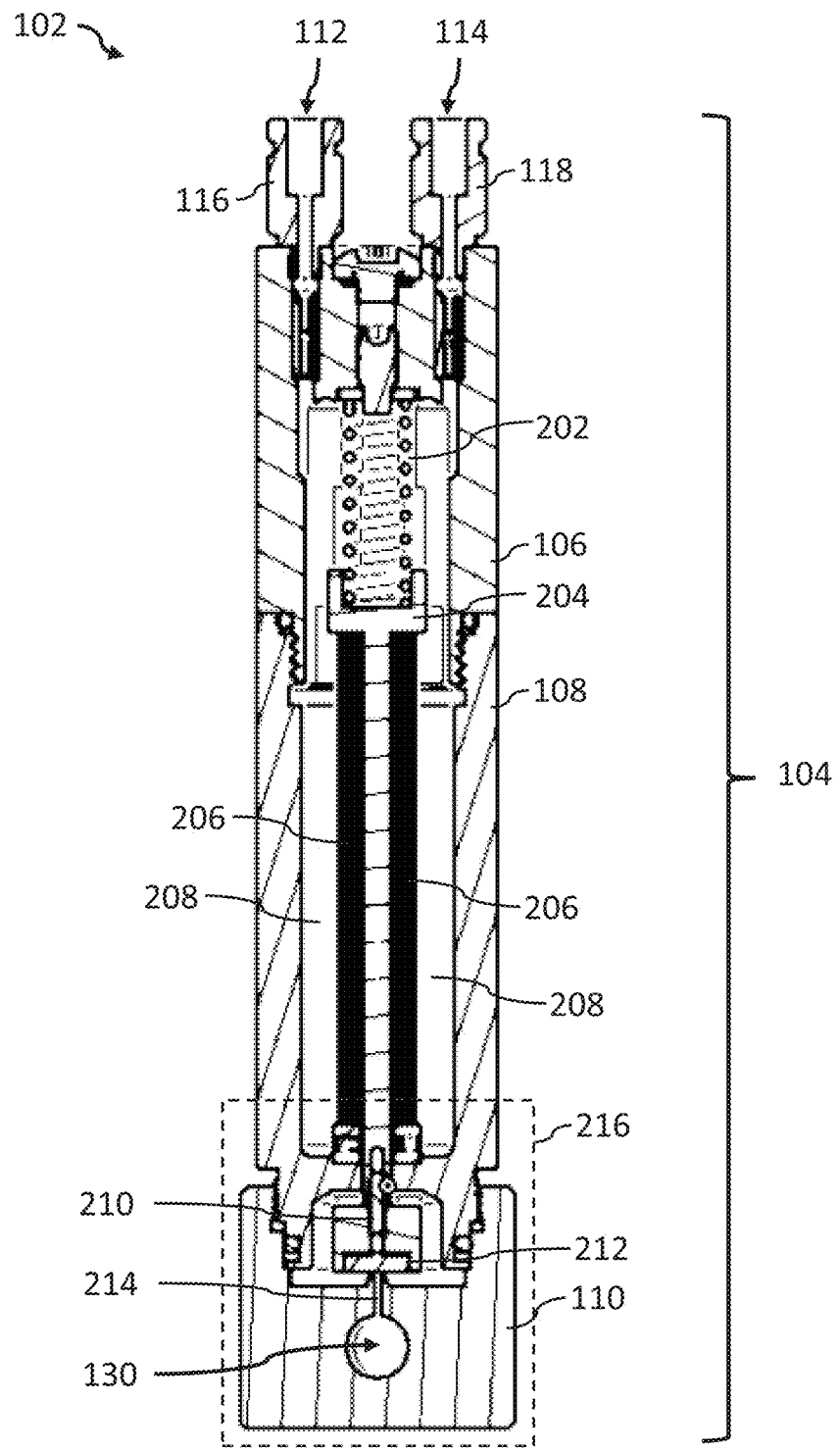
FIG. 2A is a cross-sectional view of the direct piezoelectric hydraulic valve of FIG. 1, in accordance with the present systems, devices, and methods.

FIG. 2A is a cross-sectional view of direct piezoelectric hydraulic valve 102 of FIG. 1, in accordance with the present systems, devices, and methods. Direct piezoelectric hydraulic valve 102 includes a spring 202. Spring 202 is mechanically coupled to a T-fitting 204. T-fitting 204 is mechanically coupled to an upper end of a piezoelectric sleeve 206. T-fitting 204 caps the upper end of piezoelectric sleeve 206 and extends down through an internal volume of piezoelectric sleeve 206. In operation, spring 202 urged towards an upper surface of T-fitting 204.

Piezoelectric sleeve 206 includes a length of tubular piezoelectric material. Piezoelectric sleeve 206 may include lead zirconate titanate (PZT), e.g., in one or more stacks of PZT. Piezoelectric sleeve 206 is housed in a hollow cylinder 208. Piezoelectric sleeve 206 extends from T-fitting 204 to a plunger 210, and T-fitting 204 is mechanically coupled to plunger 210 via piezoelectric sleeve 206. Plunger 210 includes a gasket 212.

Nozzle 214 is hydraulically coupled to port 130. In some implementations, nozzle 214 has a diameter in a range of 600 micrometers (μm) to 700 μm.

Portion 216 of direct piezoelectric hydraulic valve 102 is described below with reference to FIG. 2B.

Figure 2B:
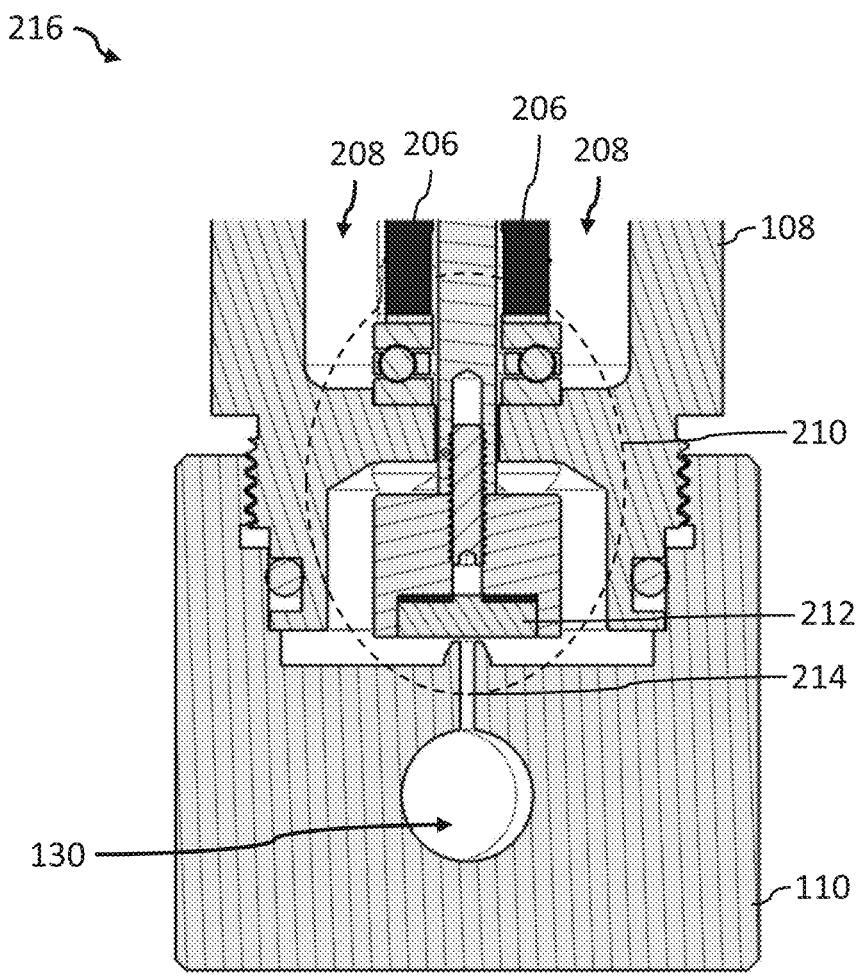
FIG. 2B is a cross-sectional view of a portion of the direct piezoelectric hydraulic valve of FIG. 1, in accordance with the present systems, devices, and methods.

FIG. 2B is a cross-sectional view of portion 216 of direct piezoelectric hydraulic valve 102 of FIG. 1, in accordance with the present systems, devices, and methods. Portion 216 is identified in FIG. 2A. Portion 216 includes central body 108, lower body 110, port 130, the lower end of piezoelectric sleeve 206, plunger 210, and gasket 212.

Referring to FIGS. 1, 2A, and 2B, a hydraulic fluid enters through port 130 in lower body 110 of hydraulic valve 102. The hydraulic fluid travels up through nozzle 214 towards gasket 212. Nozzle 214 includes a narrow channel running along a longitudinal axis of lower body 110.

Gasket 212 is held in place by plunger 210. In some implementations, gasket 212 includes a polytetrafluoroethylene (PTFE) material. As described above, plunger 210 is mechanically coupled to piezoelectric sleeve 206. Piezoelectric sleeve 206 is urged towards nozzle 214 by spring 202 and T-fitting 204 at the upper end of piezoelectric sleeve 206.

An electrical system (not shown in FIGS. 2A, and 2B) can be electrically communicatively coupled to piezoelectric sleeve 216. At least one dimension of piezoelectric sleeve 216 can be responsive to one or more electrical signals from the electrical system. For example, a length of piezoelectric sleeve 206 along a longitudinal axis of hydraulic valve 102 can be responsive to an electrical signal from the electrical system. For example, an electrical signal can cause the length of piezoelectric sleeve 206 to increase (i.e., for piezoelectric sleeve 206 to expand). A position of plunger 210 relative to nozzle 214 can be dependent on the at least one dimension of piezoelectric sleeve 206, e.g., the length of piezoelectric sleeve 206.

In operation, while there is no electric field (E-field) applied to piezoelectric sleeve 206, spring 202 urges piezoelectric sleeve 206 against plunger 210 to hold gasket 212 against an upper opening of nozzle 214. In this condition, direct piezoelectric hydraulic valve 102 is closed.

When an E-field is applied to piezoelectric sleeve 206, piezoelectric sleeve 206 expands lengthwise and urges T-fitting 204 against spring 202 causing gasket 212 to be pulled up and away from the upper opening of nozzle 214. In this condition, direct piezoelectric hydraulic valve 102 is open and hydraulic fluid can flow through nozzle 214. Hydraulic fluid can flow into a volume around gasket 212 and can exit direct piezoelectric hydraulic valve 102 via an exit port (not shown in FIG. 2B).

In some implementations, the hydraulic fluid that flows from port 130 (inlet) to the exit port (outlet) of direct piezoelectric hydraulic valve 102 is an oil, for example, a peanut oil or a mineral oil.

A hydraulic hose (not shown in FIG. 1) can be attached at port 130 using a suitable hydraulic fitting. Similarly, another hydraulic hose (also not shown in FIG. 1) can be attached at the exit port of direct piezoelectric hydraulic valve 102. The exit port is illustrated and described below with reference to direct piezoelectric hydraulic valve 300 of FIGS. 3A and 3B.

A length of piezoelectric hydraulic valve 102 can be driven at least in part by a desired flow rate at nozzle 214. In one implementation, piezoelectric hydraulic valve 102 described with reference to FIGS. 1, 2A, and 2B is about 6 cm long. In an example implementation having a desired flow rate of 0.2 LPM, gasket 212 can move in a range of 40 micrometers (μm) to 70 μm. In general, it is desirable a pressure created by spring 202 on gasket 212 is able to match a hydraulic fluid pressure in piezoelectric valve 102 by a suitable longitudinal expansion of piezoelectric sleeve 206. In one implementation, the hydraulic fluid pressure in piezoelectric valve 102 is about 800 psi, and the suitable longitudinal expansion of piezoelectric sleeve 206 is achieved by having a length of piezoelectric sleeve 206 be 40 mm.

It can be desirable in some applications for a piezoelectric hydraulic valve to be smaller in length than 6 cm. An example application where further miniaturization is advantageous is an application in which a large number of piezoelectric hydraulic valves (e.g., 40 piezoelectric hydraulic valves) are located in a restricted space, e.g., a forearm of a hydraulically-powered humanoid robot.

Figure 3A:
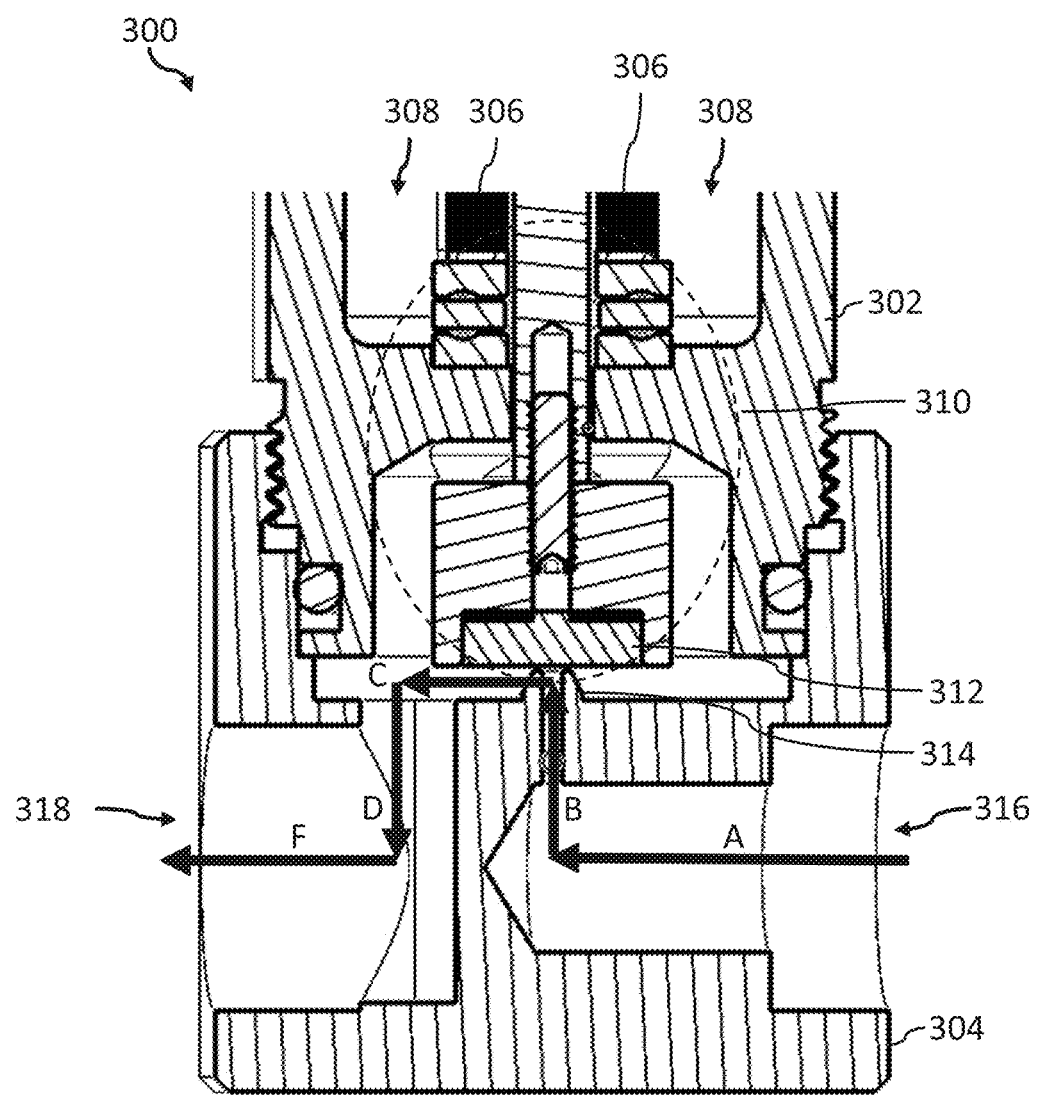
FIG. 3A is a cross-sectional view of a portion of another example implementation of a direct piezoelectric hydraulic valve, in accordance with the present systems, devices, and methods.

FIG. 3A is a cross-sectional view of a portion of another example implementation of a direct piezoelectric hydraulic valve 300, in accordance with the present systems, devices, and methods. Direct piezoelectric hydraulic valve 300 includes a central body 302, a lower body 304, a piezoelectric sleeve 306 located in an interior cylindrical volume 308 of central body 302, a plunger 310, a gasket 312, a nozzle 314, an inlet 316, and an outlet 318.

In operation, when direct piezoelectric hydraulic valve 300 is open, hydraulic fluid can flow through direct piezoelectric hydraulic valve 300 from inlet 316 to outlet 318 in directions indicated by arrows A, B, C, D, and F.

Figure 3B:
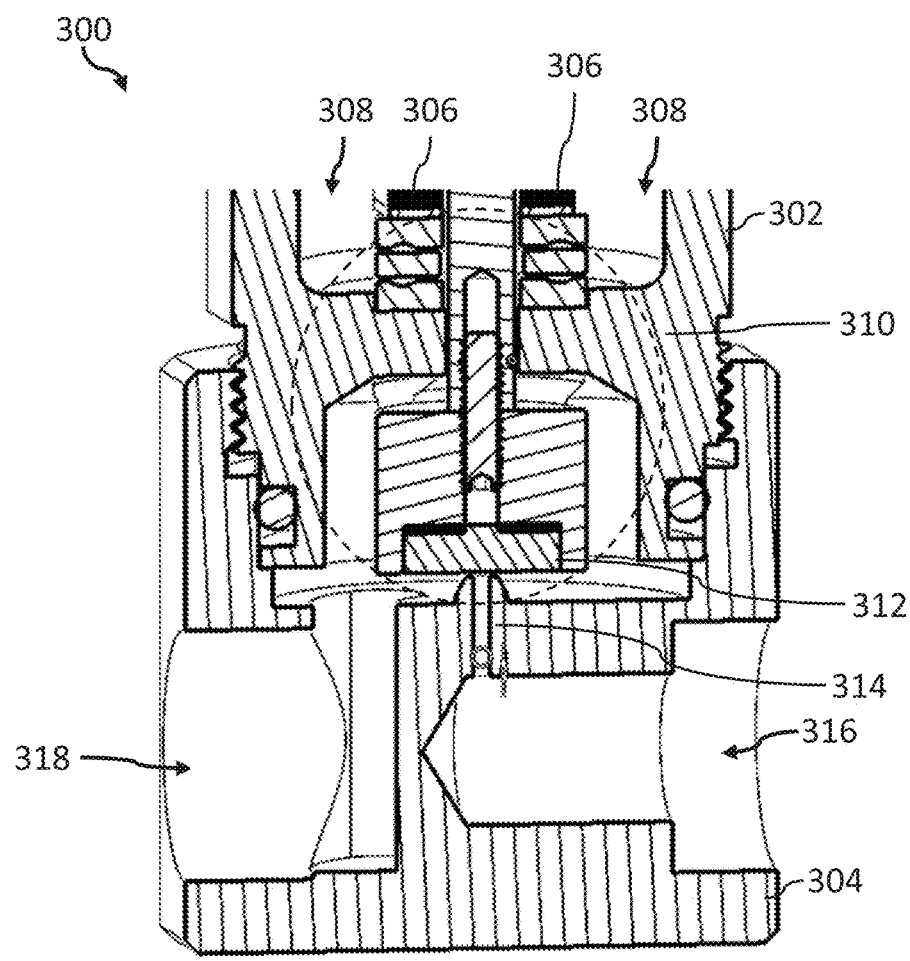
FIG. 3B is a perspective view of the cross-sectioned direct piezoelectric hydraulic valve of FIG. 3A, in accordance with the present systems, devices, and methods.

FIG. 3B is a perspective view of cross-sectioned direct piezoelectric hydraulic valve 300 of FIG. 3A, in accordance with the present systems, devices, and methods.

Figure 4A:
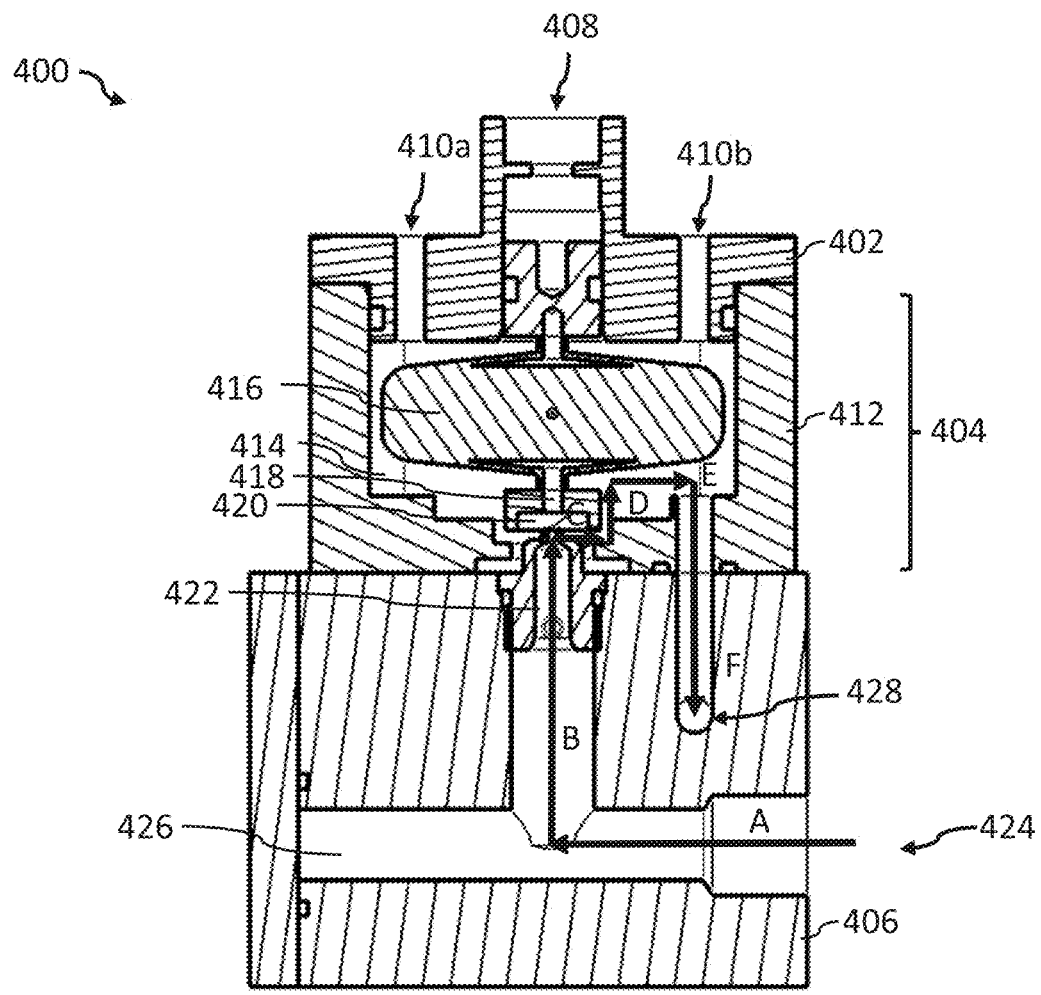
FIG. 4A is a cross-sectional view of an example implementation of an amplified piezoelectric hydraulic valve, in accordance with the present systems, devices, and methods.

FIG. 4A is a cross-sectional view of an example implementation of an amplified piezoelectric hydraulic valve 400, in accordance with the present systems, devices, and methods. Amplified piezoelectric hydraulic valve 400 is more compact than direct piezoelectric hydraulic valve 102 of FIGS. 1 and 2A.

Amplified piezoelectric hydraulic valve 400 includes an upper body 402, a central body 404, and a lower body 406. In some implementations, valve body 402 includes, or is manufactured from, aluminum. Upper body 402 includes a central port 408 and two side ports 410a and 410b.

Central body 404 includes a housing 412 enclosing a chamber 414. Chamber 414 contains a piezoelectric block 416. Piezoelectric block 416 is mechanically coupled to a plunger 418. Plunger 418 includes a gasket 420. In amplified piezoelectric hydraulic valve 400, piezoelectric sleeve 206 of direct piezoelectric hydraulic valve 102 of FIGS. 1, 2A, and 2B is replaced by piezoelectric block 416. An electric field (E-field) applied to piezoelectric block 416 can cause piezoelectric block 416 to contract in size. Contraction of piezoelectric block 416 is amplified at least in part because piezoelectric block 416 is an ellipsoid.

Lower body 406 includes a nozzle 422. In some implementations, nozzle 422 has a diameter in a range of 600 micrometers (μm) to 700 μm. In operation, when amplified piezoelectric hydraulic valve 400 is closed, piezoelectric block 416 urges plunger 418 and gasket 420 against nozzle 422 to stop, or at least reduce, a flow of hydraulic fluid through amplified piezoelectric hydraulic valve 400.

An electrical system (not shown in FIG. 4A) can be electrically communicatively coupled to piezoelectric block 416. At least one dimension of piezoelectric block 416 can be responsive to one or more electrical signals from the electrical system. A position of plunger 418 relative to nozzle 422 can be dependent on the at least one dimension of piezoelectric block 416. For example, when piezoelectric block 416 is an ellipsoid, a minor axis of the ellipsoid can be responsive to an electrical signal from the electrical system.

In operation, while there is no electric field (E-field) applied to piezoelectric block 416, piezoelectric block 416 urges plunger 418 to hold gasket 420 against an upper opening of nozzle 422. In this condition, amplified piezoelectric hydraulic valve 400 is closed.

When an E-field is applied to piezoelectric block 416, piezoelectric block 416 contracts sufficiently to open amplified piezoelectric hydraulic valve 400 and allow a flow of hydraulic fluid through amplified piezoelectric hydraulic valve 400.

In some implementations, contraction of piezoelectric block 416 is sufficient to create a gap between gasket 420 and nozzle 422 in the range of 40 μm to 70 μm. In these implementations, the rate of flow of hydraulic fluid through amplified piezoelectric hydraulic valve 400 can be about 0.2 LPM, and the physical dimensions of amplified piezoelectric hydraulic valve 400 can be about 1 cm×1 cm×1 cm.

In some implementations, the gap between gasket 420 and nozzle 422 is proportional to an electrical power of the E-field applied to piezoelectric block 416. The proportionality of amplified piezoelectric hydraulic valve 400 is one of its advantages. In operation, amplified piezoelectric hydraulic valve 400 is able to adjust the rate of flow of hydraulic fluid through amplified piezoelectric hydraulic valve 400 to a value in a range of zero to a predetermined upper limit with very high resolution. The predetermined upper limit may be less than a design limit of piezoelectric hydraulic valve 400.

In an example implementation, the resolution is 0.00006 of the range. In the same example implementation, when the predetermined upper limit to the rate of flow of hydraulic fluid through amplified piezoelectric hydraulic valve 400 is 0.4 LPM, amplified piezoelectric hydraulic valve 400 is able to adjust the rate of flow of hydraulic fluid through amplified piezoelectric hydraulic valve 400 in increments of 0.000024 LPM.

Lower body 406 also includes an inlet 424, an inlet chamber 426, and an outlet chamber 428. In operation, when amplified piezoelectric hydraulic valve 400 is open, hydraulic fluid can flow through amplified piezoelectric hydraulic valve 400 from inlet 424 to outlet chamber 428 in directions indicated by arrows A, B, C, D, E, and F.

Figure 4B:
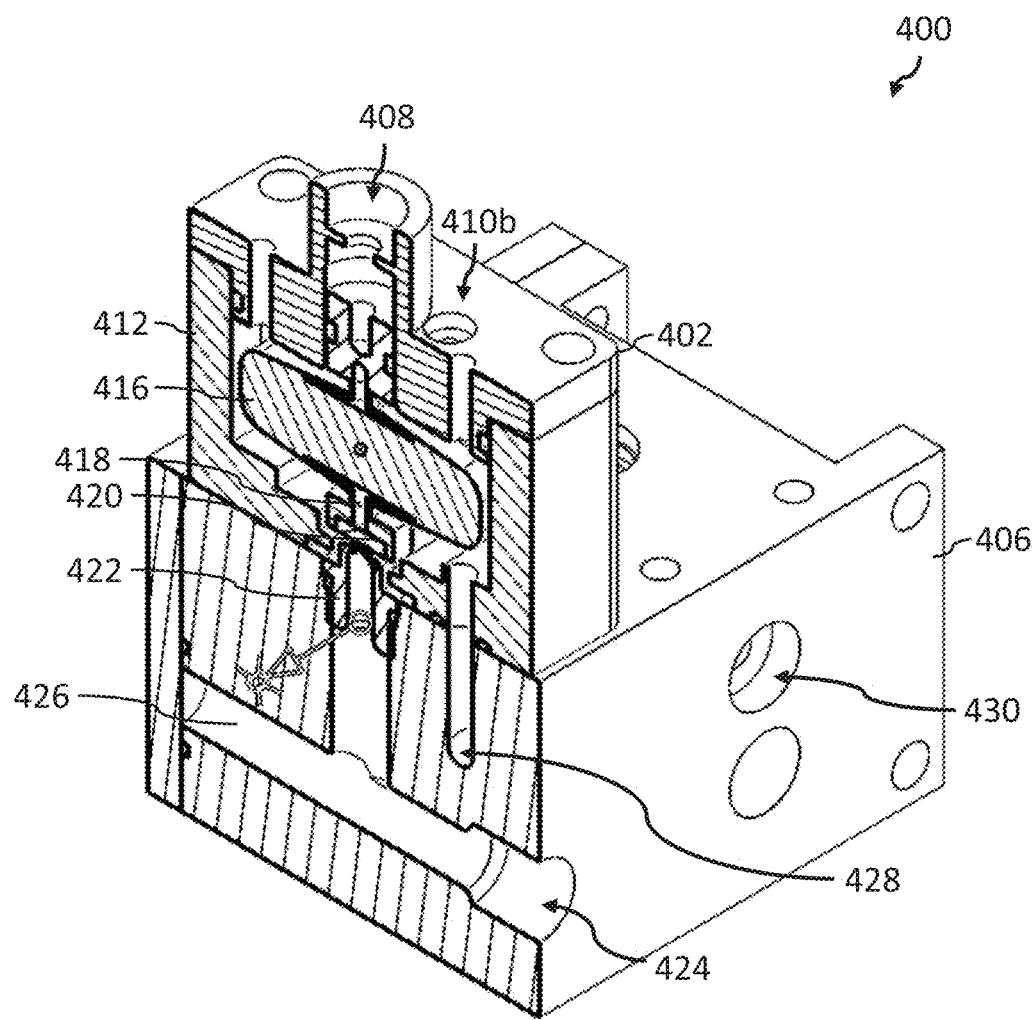
FIG. 4B is a perspective view of the cross-sectioned amplified piezoelectric hydraulic valve of FIG. 4A, in accordance with the present systems, devices, and methods.

FIG. 4B is a perspective view of the cross-sectioned amplified piezoelectric hydraulic valve 400 of FIG. 4A, in accordance with the present systems, devices, and methods. Amplified piezoelectric hydraulic valve 400 includes an outlet 430 fluidly coupled to outlet chamber 428.

Figure 5:
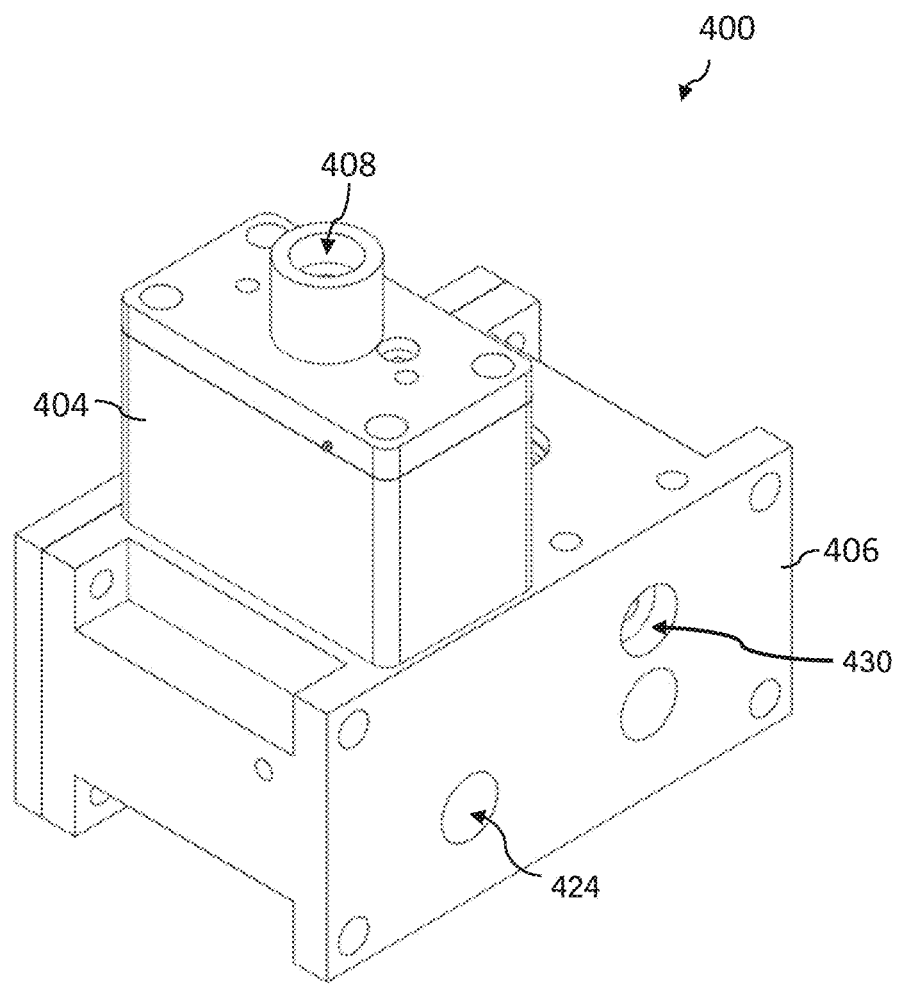
FIG. 5 is a perspective view of the amplified piezoelectric hydraulic valve of FIGS. 4A and 4B, in accordance with the present systems, devices, and methods.

FIG. 5 is a perspective view of the cross-sectioned amplified piezoelectric hydraulic valve 400 of FIGS. 4A and 4B, in accordance with the present systems, devices, and methods.

Figure 6A:
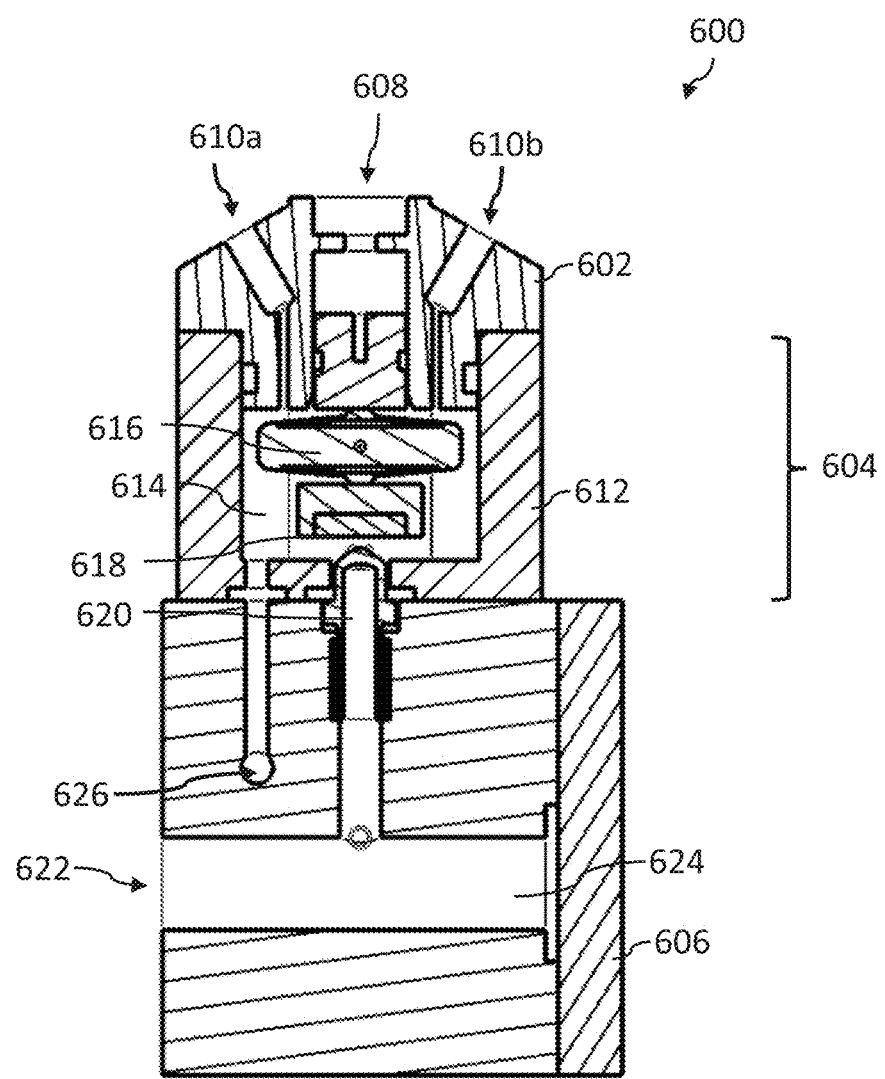
FIG. 6A is a cross-sectional view of another example implementation of an amplified piezoelectric hydraulic valve, in accordance with the present systems, devices, and methods.

FIG. 6A is a cross-sectional view of another example implementation of an amplified piezoelectric hydraulic valve 600, in accordance with the present systems, devices, and methods. Amplified piezoelectric hydraulic valve 600 is a variant of amplified piezoelectric hydraulic valve 400 of FIGS. 4A, 4B, and 5. Amplified piezoelectric hydraulic valve 600 is more miniaturized than amplified piezoelectric hydraulic valve 400 of FIGS. 4A, 4B, and 5.

Amplified piezoelectric hydraulic valve 600 includes an upper body 602, a central body 604, and a lower body 606. In some implementations, valve body 602 includes, or is manufactured from, aluminum. Upper body 602 includes a central port 608 and two side ports 610a and 610b.

Central body 604 includes a housing 612 enclosing a chamber 614. Chamber 614 contains a piezoelectric block 616. Piezoelectric block 616 is mechanically coupled to a gasket 618. An electric field (E-field) applied to piezoelectric block 616 can cause piezoelectric block to contract (i.e., shrink in size).

Lower body 606 includes a nozzle 620. In some implementations, nozzle 620 has a diameter in a range of 600 micrometers (μm) to 700 μm. In operation, when amplified piezoelectric hydraulic valve 600 is closed, piezoelectric block 616 urges gasket 618 against nozzle 620 to prevent, or at least reduce, a flow of hydraulic fluid through amplified piezoelectric hydraulic valve 600. When an E-field is applied to piezoelectric block 616, piezoelectric block 616 shrinks sufficiently to open amplified piezoelectric hydraulic valve 600 and allow a flow of hydraulic fluid through amplified piezoelectric hydraulic valve 600.

In some implementations, contraction of piezoelectric block 616 is sufficient to create a gap between gasket 618 and nozzle 620 in the range of 40 μm to 70 μm. In these implementations, the rate of flow of hydraulic fluid through amplified piezoelectric hydraulic valve 600 can be about 0.2 LPM, and the physical dimensions of amplified piezoelectric hydraulic valve 600 can be less than about 1 cm×1 cm×1 cm.

Lower body 606 also includes an inlet 622, an inlet chamber 624, and an outlet chamber 626. In operation, when amplified piezoelectric hydraulic valve 600 is open, hydraulic fluid can flow through amplified piezoelectric hydraulic valve 600 from inlet 622 to outlet chamber 626.

Figure 6B:
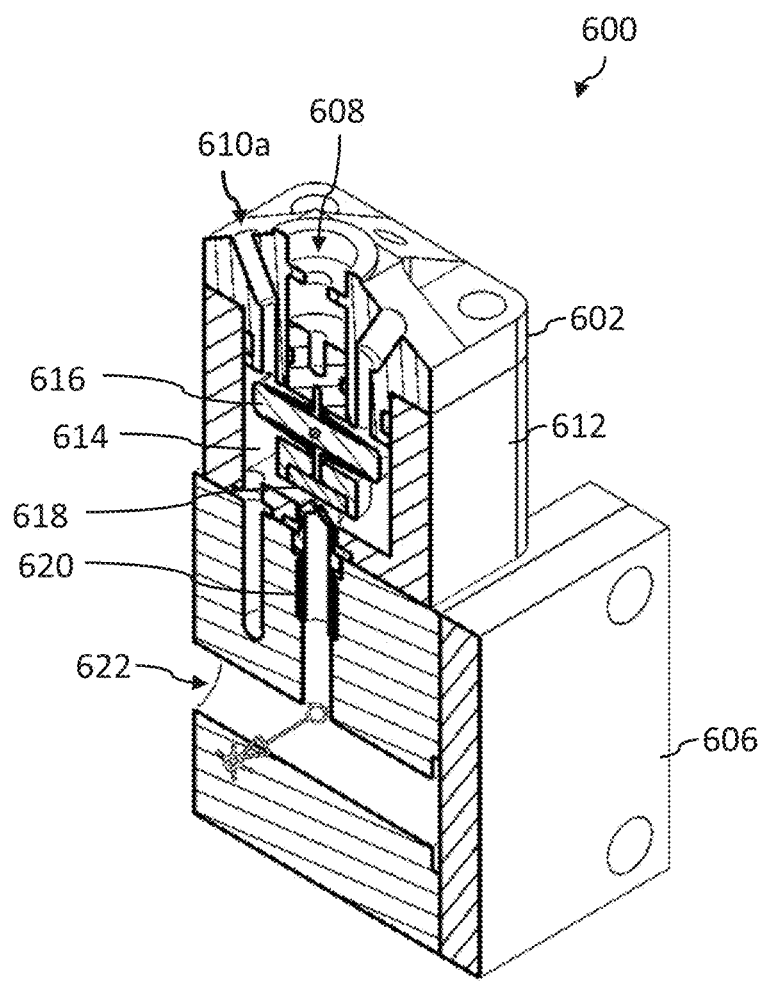
FIG. 6B is a perspective view of the cross-sectioned amplified piezoelectric hydraulic valve of FIG. 6A, in accordance with the present systems, devices, and methods.

FIG. 6B is a perspective view of the cross-sectioned amplified piezoelectric hydraulic valve 600 of FIG. 6A, in accordance with the present systems, devices, and methods. Amplified piezoelectric hydraulic valve 600 includes an outlet 628 (shown in FIG. 7) fluidly coupled to outlet chamber 626 (shown in FIG. 6A).

Figure 7:
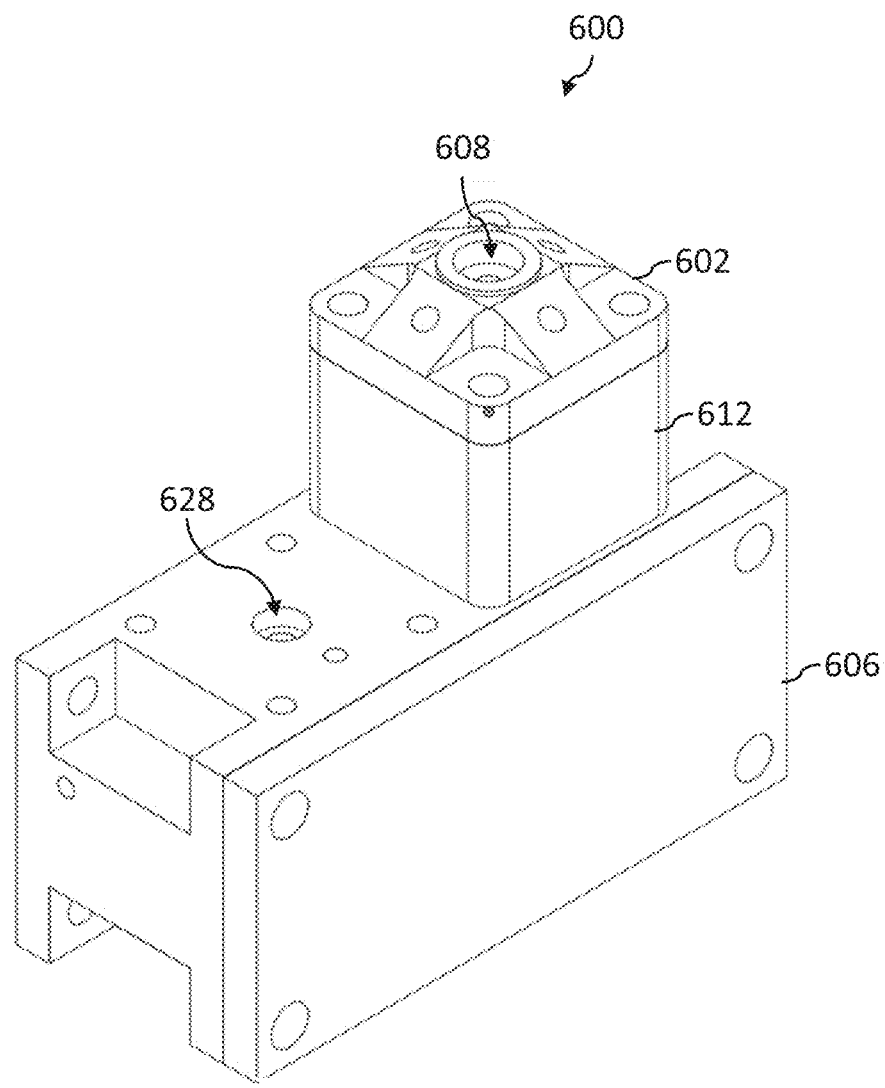
FIG. 7 is a perspective view of the amplified piezoelectric hydraulic valve of FIGS. 6A and 6B, in accordance with the present systems, devices, and methods.

FIG. 7 is a perspective view of the cross-sectioned amplified piezoelectric hydraulic valve 600 of FIGS. 6A and 6B, in accordance with the present systems, devices, and methods.

Figure 8:
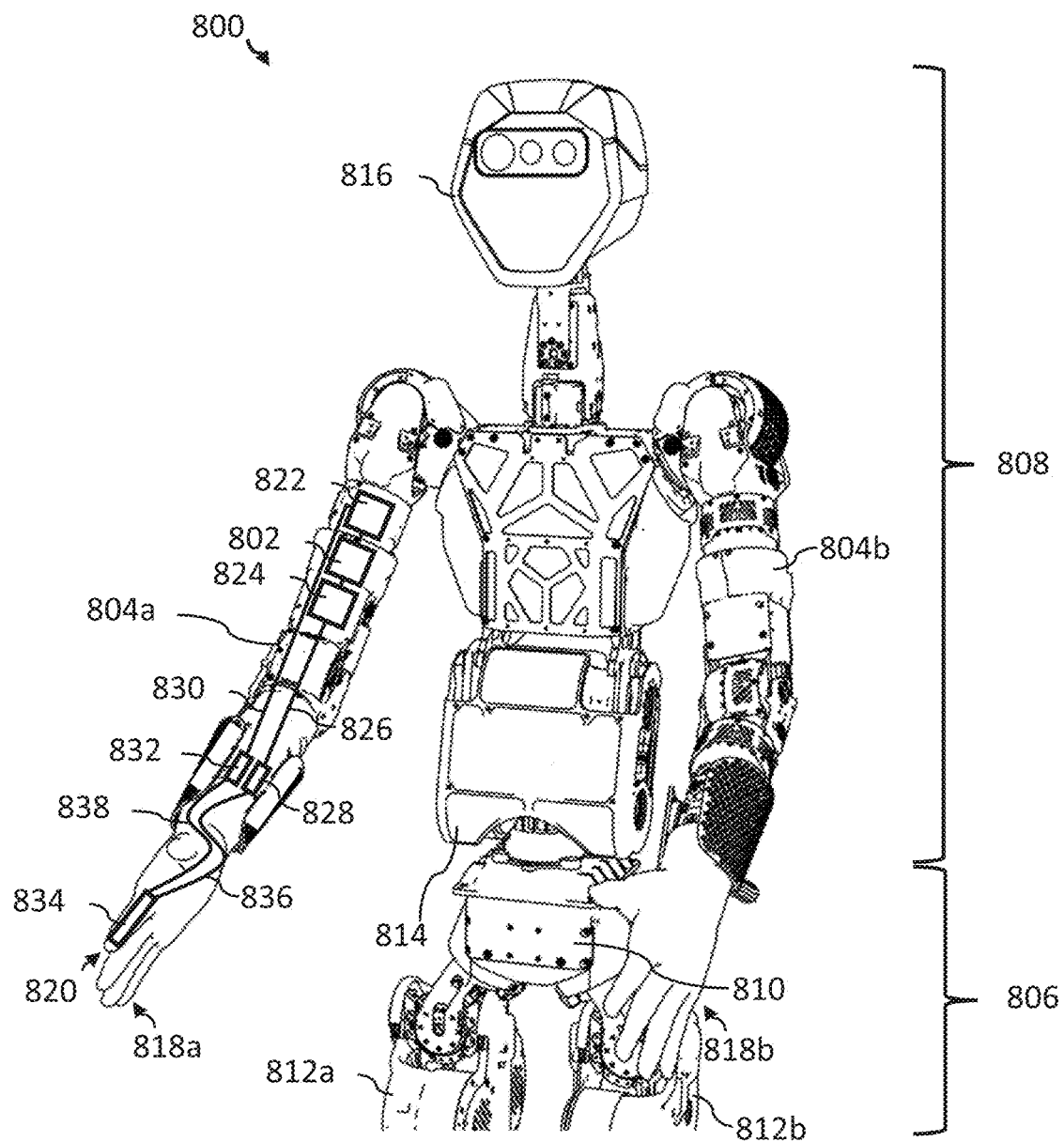
FIG. 8 is a schematic drawing of an example implementation of a hydraulically-powered robot with a miniaturized hydraulic valve integrated with an arm of the robot, in accordance with the present systems, devices, and methods.

FIG. 8 is a schematic drawing of an example implementation of a hydraulically-powered robot 800 with a hydraulic pump 802 integrated with an arm 804a of robot 800, in accordance with the present systems, devices, and methods. Hoses are also referred to in the present application as hydraulic hoses.

Robot 800 comprises a base 806 and a humanoid upper body 808. Base 806 comprises a pelvic region 810 and two legs 812a and 812b (collectively referred to as legs 812). Only the upper portion of legs 812 is shown in FIG. 8. In other example implementations, base 806 may comprise a stand and (optionally) one or more wheels.

Upper body 808 comprises a torso 814, a head 816, right-side arm 804a and a left-side arm 804b (collectively referred to as arms 804), and a right hand 818a and a left hand 818b (collectively referred to as hands 818). Arms 804 of robot 800 are also referred to in the present application as robotic arms. Arms 804 of robot 800 are humanoid arms. In other implementations, arms 804 have a form factor that is different from a form factor of a humanoid arm.

Hands 818 are also referred to in the present application as end effectors. In other implementations, hands 818 have a form factor that is different from a form factor of a humanoid hand. Each of hands 818 comprises one or more digits, for example, digit 820 of hand 818a. Digits may include fingers, thumbs, or similar structures of the hand or end effector.

In some implementations, base 804 and/or torso 814 of upper body 808 house a hydraulic control system, for example. In some implementations, components of the hydraulic control system may alternatively be located outside the robot, e.g., on a wheeled unit that rolls with the robot as it moves around, or in a fixed station to which the robot is tethered.

The hydraulic control system of robot 800 comprises a hydraulic pump 802, a reservoir 822, and an accumulator 824, housed in arm 804a. Hose 826 provides a hydraulic coupling between accumulator 824 and a pressure valve 828 of the hydraulic control system. Hose 830 provides a hydraulic coupling between an exhaust valve 832 of the hydraulic control system and reservoir 822.

Pressure valve 828 is hydraulically coupled to an actuation piston 834 by a hose 836. Actuation piston 834 is hydraulically coupled to exhaust valve 832 by a hose 838. Hoses 826 and 836, and pressure valve 828, provide a forward path to actuation piston 834. Hoses 830 and 838, and exhaust valve 832 provide a return path to actuation piston 834. Pressure valve 828 and exhaust valve 832 can control actuation piston 834, and can cause actuation piston 834 to move, which can cause a corresponding motion of at least a portion of hand 818a, for example, digit 820.

In some implementations, pressure valve 828 and exhaust valve 832 are electrohydraulic servo valves controlled by a controller (not shown in FIG. 8). The electrohydraulic servo valves are also referred to in the present application as servo valves and servo-controlled valves. The controller may be implemented by any suitable combination of hardware, software, and/or firmware. The controller may include, for example one or more application-specific integrated circuit (s), standard integrated circuit(s), and/or computer program (s) executed by any number of computers, microcontrollers, and/or processors (including, e.g., microprocessors, central processing units). In other implementations, other suitable types of valves may be used.

In other implementations, the hydraulic drive mechanism includes a motor and a drive piston. The drive piston can be propelled forward linearly by a leadscrew that can be coupled to the motor through a flexible shaft coupler. The drive piston can be hydraulically coupled to a hose containing a hydraulic fluid. The hose can extend from the drive piston to an actuation piston located elsewhere on robot 800, for example, in hand 818a. When the drive piston is driven by the motor, the actuation piston can be forced to move, which can cause a corresponding motion of at least a portion of robot 800.

In some implementations, the hydraulic fluid in the hydraulic hoses of FIG. 8 (including hoses 826, 830, 836, and 838) is an oil, for example, peanut oil or mineral oil.

Each of hands 818 may have more than one degree of freedom (DOF). In some implementations, each hand has up to eighteen (18) DOFs. Each DOF can be driven by a respective actuation piston (for example, actuation piston 834). For clarity of illustration, only one actuation piston is shown in FIG. 8. Each actuation piston may be located in hands 818.

Single-action pistons can use a spring to provide a return action for the piston. A DOF may be double-acting to enable a push-pull motion, which means there is a respective hose coupled to each side of the actuation piston. In one implementation, there are two double-acting DOFs, and consequently twenty (20) hoses running to each of hands 818 to control eighteen (18) DOFs of each hand. In some implementations, at least some of the hoses shown in FIG. 8 (e.g., hoses 826, 830, 836, and 838) belong to a bundle of hoses that can accommodate twenty (20) one-eighth inch (⅛ in.) hoses.

In some implementations, a robot with an integrated hydraulic system, such as robot 800 of FIG. 8, may employ any or all of the teachings of U.S. Provisional Patent Application Ser. No. 63/191,732, filed May 21, 2021 and entitled "Systems, Devices, and Methods for A Hydraulic Robot Arm", which is incorporated herein by reference in its entirety.

Though the example implementation of FIG. 8 of a hydraulically-powered robot with only a single hydraulic system, a person of skill in the art will appreciate that a hydraulically-powered robot may include multiple hydraulic systems. In some implementations, at least some of the multiple hydraulic systems are hydraulically-isolated from one another. In some implementations, at least some of the multiple hydraulic systems share a common hydraulic pump.

It can be beneficial for a hydraulically-powered robot to have multiple hydraulically-isolated hydraulic systems. For example, a hydraulically-powered robot may have multiple components or devices that include hydraulic actuators. A single hydraulic system operable to control the hydraulic actuators of multiple components or devices may be too large, complex, or costly for practical implementations. It may be difficult, for example, to route hydraulic hoses from a single shared pump to multiple components or devices located in different regions of the robot (especially internally, as in robot 800). A hydraulic system dedicated to a single component or device, or dedicated to a subset of the multiple components or devices, may be more localized, and more readily adapted to fit within a desired form factor.

Direct piezoelectric hydraulic valve 102 of FIGS. 1, 2A, and 2B, amplified piezoelectric hydraulic valve 400 of FIGS. 4A, 4B, and 5, and/or amplified piezoelectric hydraulic valve 600 of FIGS. 6A, 6B, and 7 can be used in the hydraulic control system of robot 800 to control a flow of hydraulic fluid in the hydraulic control system. Direct piezoelectric hydraulic valve 102 of FIGS. 1, 2A, and 2B, amplified piezoelectric hydraulic valve 400 of FIGS. 4A, 4B, and 5, and/or amplified piezoelectric hydraulic valve 600 of FIGS. 6A, 6B, and 7 can be used, for example, in pressure valve 828 and/or exhaust valve 832.

In some implementations, pressure valve 828 and exhaust valve 832 can be replaced by a single hydraulic valve having two channels. A two-channel hydraulic valve can be used to control pressure and exhaust flows to/from an actuation piston.

Direct piezoelectric hydraulic valve 102 of FIGS. 1, 2A, and 2B, amplified piezoelectric hydraulic valve 400 of FIGS. 4A, 4B, and 5, and/or amplified piezoelectric hydraulic valve 600 of FIGS. 6A, 6B, and 7 can be more compact than other types of hydraulic valves, and can be beneficially deployed in restricted spaces and/or in situations where there are a large number of hydraulic connections to be made.

Figure 9:
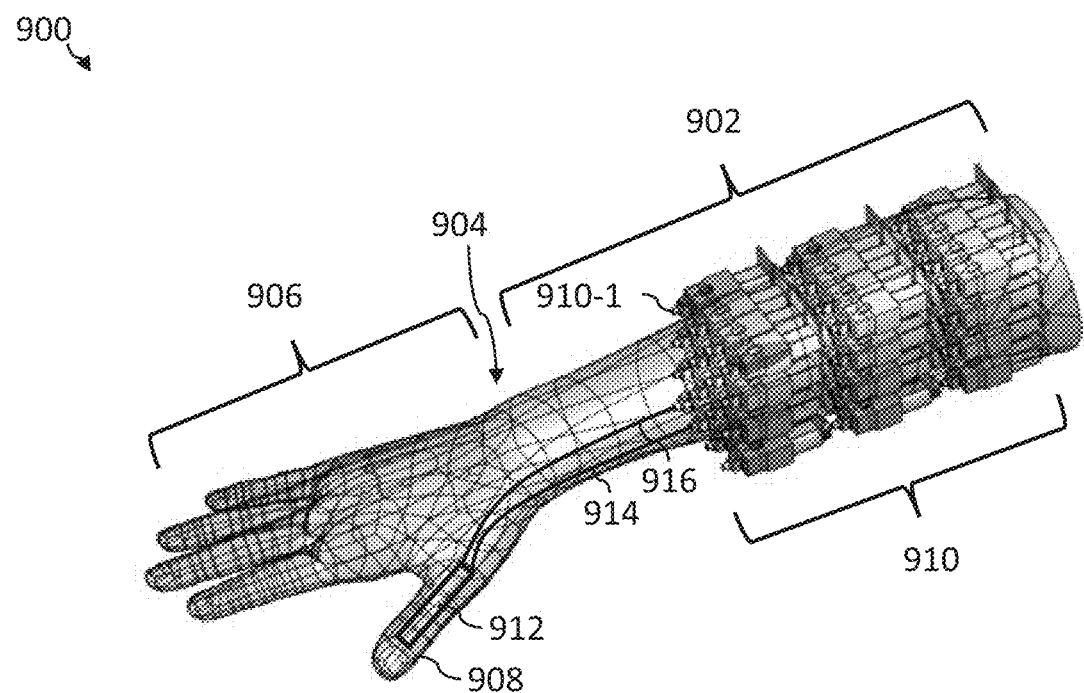
FIG. 9 is a schematic drawing of an example implementation of a portion of a hydraulic system in a forearm, wrist, and hand of a robot (e.g., the robot of FIG. 8), in accordance with the present systems, devices, and methods.

FIG. 9 is a schematic drawing of an example implementation of a portion 900 of a hydraulic system in a forearm 902, wrist 904, and hand 906 of a robot (e.g., robot 800 of FIG. 8), in accordance with the present systems, devices, and methods. Hand 906 includes a digit 908.

Forearm 902 includes a set of valves 910 which is integrated with forearm 902. Valves 910 include valve 910-1. (Only one valve is separately labeled for clarity of illustration.) Valves 910 may include pressure valves and exhaust valves. Valves 910 may include electrohydraulic servo valves, and may be operated by a controller (not shown in FIG. 9).

Digit 908 includes an actuation piston 912 integrated with digit 908. Actuation piston 912 is hydraulically coupled to valves 910 via a pressure hose 914 and an exhaust hose 916.

Pressure hose 914 and exhaust hose 916 pass through wrist 904. Wrist 904 can be a restricted space (as described above), and, while the diameters of hoses 914 and 916 may generally need to be large enough to fulfill the pressure/force requirements of portion 900 of the hydraulic system, it can be advantageous for a respective diameter of each of hoses 914 and 916 to be small enough, and flexible enough, in the region of wrist 904, to navigate wrist 904.

Direct piezoelectric hydraulic valve 102 of FIGS. 1, 2A, and 2B, amplified piezoelectric hydraulic valve 400 of FIGS. 4A, 4B, and 5, and/or amplified piezoelectric hydraulic valve 600 of FIGS. 6A, 6B, and 7 can be used in portion 900 of the hydraulic control system of FIG. 9 to control a flow of hydraulic fluid in the hydraulic control system. Direct piezoelectric hydraulic valve 102 of FIGS. 1, 2A, and 2B, amplified piezoelectric hydraulic valve 400 of FIGS. 4A, 4B, and 5, and/or amplified piezoelectric hydraulic valve 600 of FIGS. 6A, 6B, and 7 may be used, for example, in valves 910. In some implementations, direct piezoelectric hydraulic valve 102 of FIGS. 1, 2A, and 2B, amplified piezoelectric hydraulic valve 400 of FIGS. 4A, 4B, and 5, and/or amplified piezoelectric hydraulic valve 600 of FIGS. 6A, 6B, and 7 can be used to control both pressure and exhaust flows to/from an actuation piston (e.g., actuation piston 912).

As shown in FIG. 9, forearm 902, wrist 904, and hand 906 can be restricted spaces, and there can be a large number of hydraulic connections to be made (e.g., to valves 910). In one implementation, there are two double-acting DOFs, and consequently twenty (20) hoses running to hand 906 to control eighteen (18) DOFs of each hand. In some implementations, there are twenty (20) one-eighth inch (⅛ in.) hoses to accommodate in forearm 902, wrist 904, and hand 906.

As described above, it can be desirable for a hydraulic valve to operate efficiently at a high pressure and a low flow rate. The miniaturized hydraulic valves described above are referred to in the present application as "high pressure, low flow rate" valves. For example, the miniaturized hydraulic valves described in the present application can combine operation at high fluid pressure (e.g., more than about 700 psi) with operation at low fluid flow rate (e.g., less than about 0.5 LPM).

For example, in robotic applications, it is possible to relate a fluid pressure and a fluid flow rate in a hydraulic valve used to operate elements of a robotic hand to a desired performance of the robotic hand, and to desired physical dimensions and a form factor of the hydraulic valve. It is one aspect of the present technology that a nozzle size and a stroke of the hydraulic valve can be determined at least in part from the desired performance of the hydraulic valve, and the desired physical dimensions and the form factor of the hydraulic valve. Determining the nozzle size and the stroke of the hydraulic valve can include analysis and/or simulation, e.g., a computational fluid dynamics (CFD) simulation.

Figure 10:
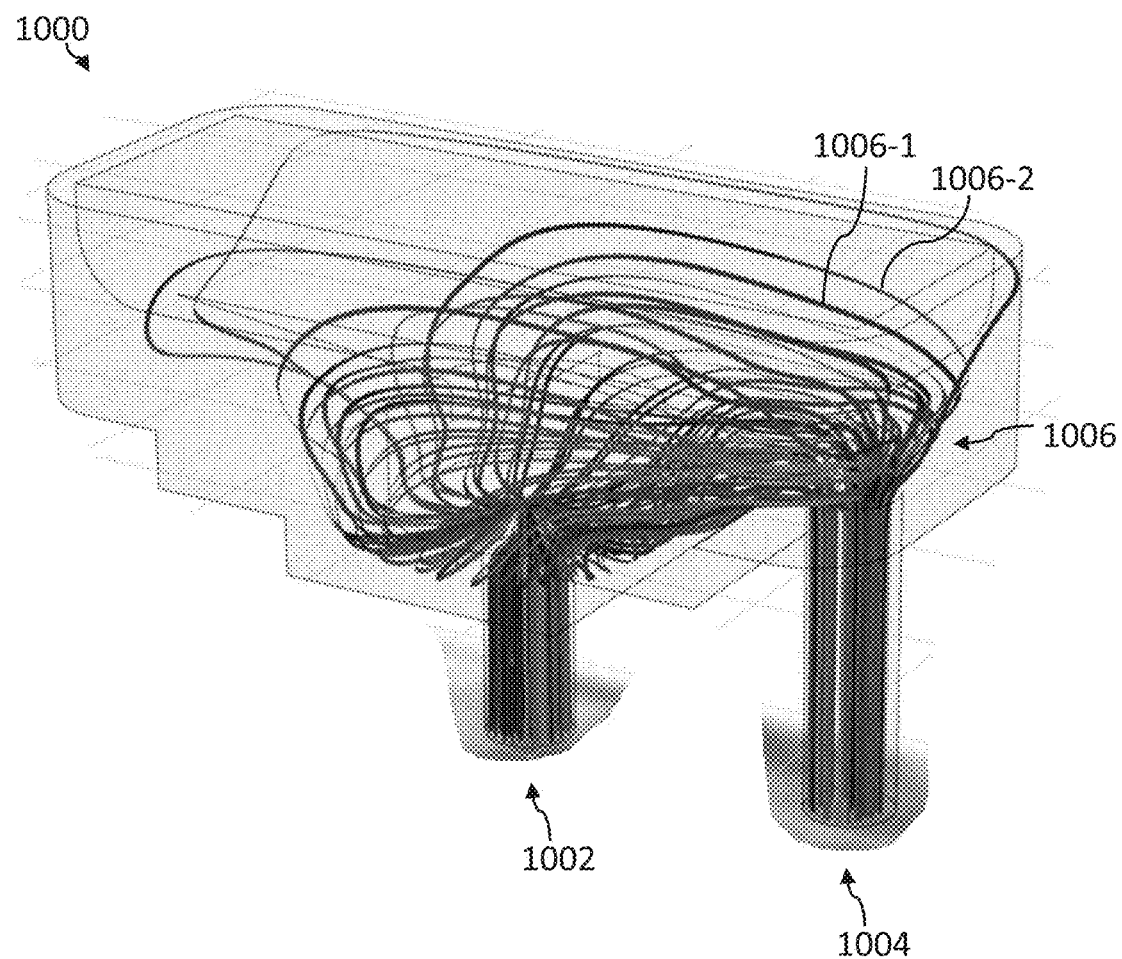
FIG. 10 is a screenshot of an example CFD simulation showing flow paths in an example implementation of an amplified piezoelectric hydraulic valve (e.g., the amplified piezoelectric hydraulic valve of FIGS. 4A, 4B, and 5), in accordance with the present systems, devices, and methods.

FIG. 10 is a screenshot 1000 of an example CFD simulation showing flow paths in an example implementation of an amplified piezoelectric hydraulic valve (e.g., amplified piezoelectric hydraulic valve 400 of FIGS. 4A, 4B, and 5), in accordance with the present systems, devices, and methods.

Screenshot 1000 includes inlet 1002, outlet 1004, and flow paths 1006 (e.g., flow paths 1006-1 and 1006-2). Screenshot 1000 shows the CFD simulation results for an example stroke of 40 μm for the amplified piezoelectric hydraulic valve. The CFD simulation results illustrated in screenshot 1000 show that a desired upper limit to a fluid flow rate is achievable with the example stroke of 40 μm, for illustrative purposes. Other implementations of the present technology can have different strokes.

Figure 11:
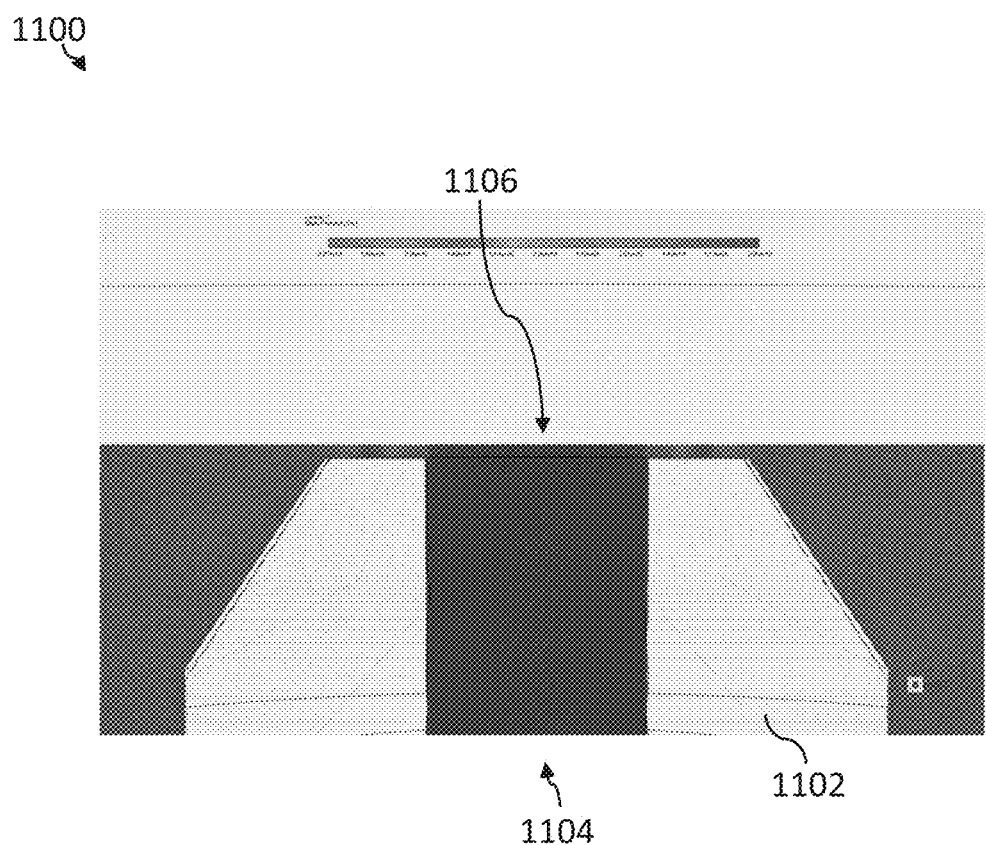
FIG. 11 is a screenshot of the same example CFD simulation as FIG. 10 showing a static pressure immediately adjacent and above a nozzle of the amplified hydraulic valve (e.g., the amplified piezoelectric hydraulic valve of FIGS. 4A, 4B, and 5), in accordance with the present systems, devices, and methods.

FIG. 11 is a screenshot 1100 of the same example CFD simulation as FIG. 10 showing a static pressure immediately adjacent and above a nozzle of the amplified hydraulic valve (e.g., amplified piezoelectric hydraulic valve 400 of FIGS. 4A, 4B, and 5), in accordance with the present systems, devices, and methods.

Screenshot 1100 includes a nozzle 1102 with a channel 1104. Screenshot 1100 shows the static pressure at an upper end of channel 1104 where channel 1104 exits nozzle 1102. The example CFD simulation results illustrated in FIG. 11 are for an amplified piezoelectric hydraulic valve in which there is a 40 μm gap between the upper end of channel 1104 of nozzle 1102 and a gasket for illustrative purposes (e.g., gasket 420 of amplified piezoelectric hydraulic valve 400 of FIGS. 4A, 4B, and 5).

The CFD simulation results illustrated in screenshot 1100 show that a desired fluid pressure is achievable with the example stroke of 40 μm and example nozzle dimensions used in the CFD simulation. Other implementations of the present technology can use different strokes and/or nozzle dimensions.

Figure 12A:
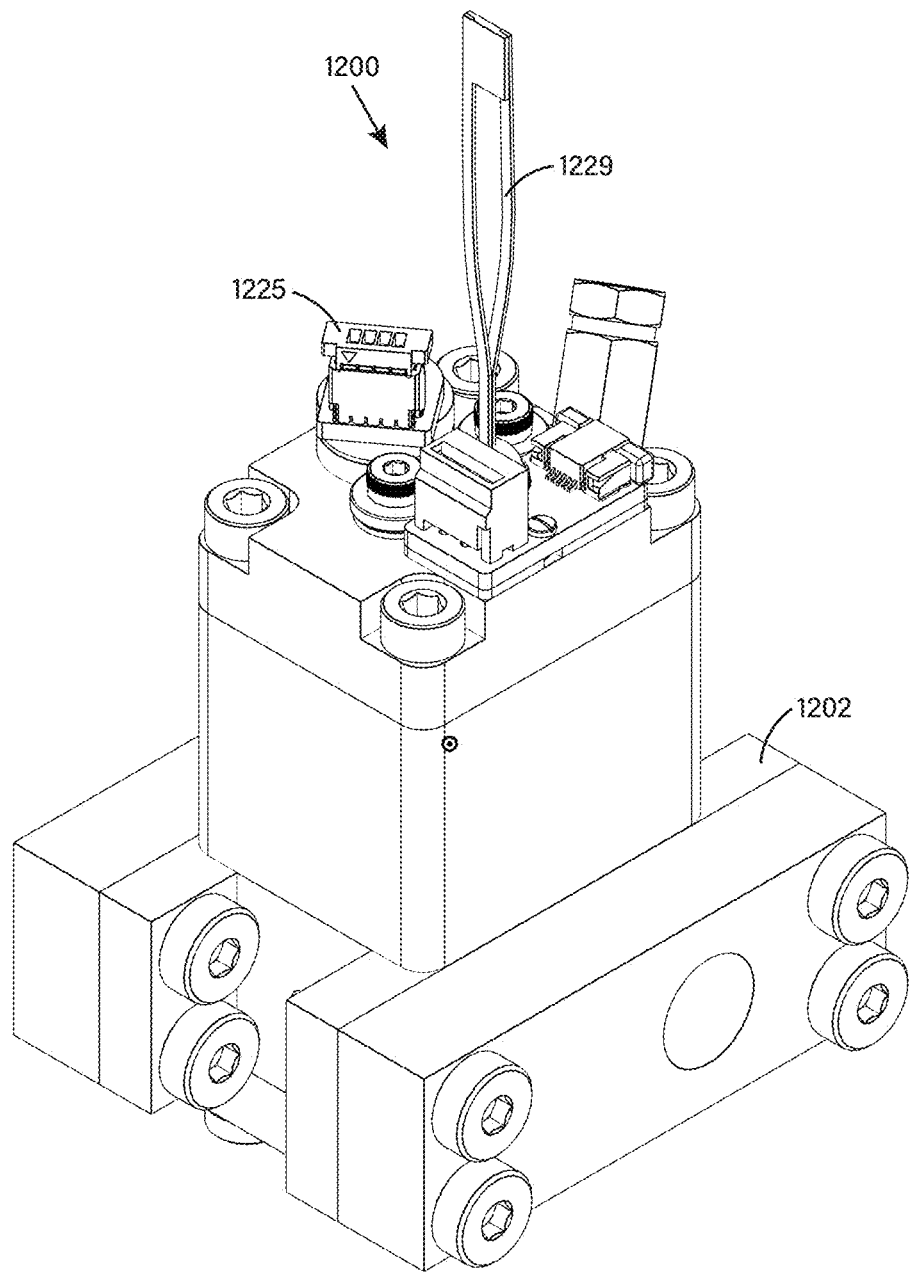
FIG. 12A is a perspective view of an electrohydraulic valve including one valve unit.
Figure 12B:
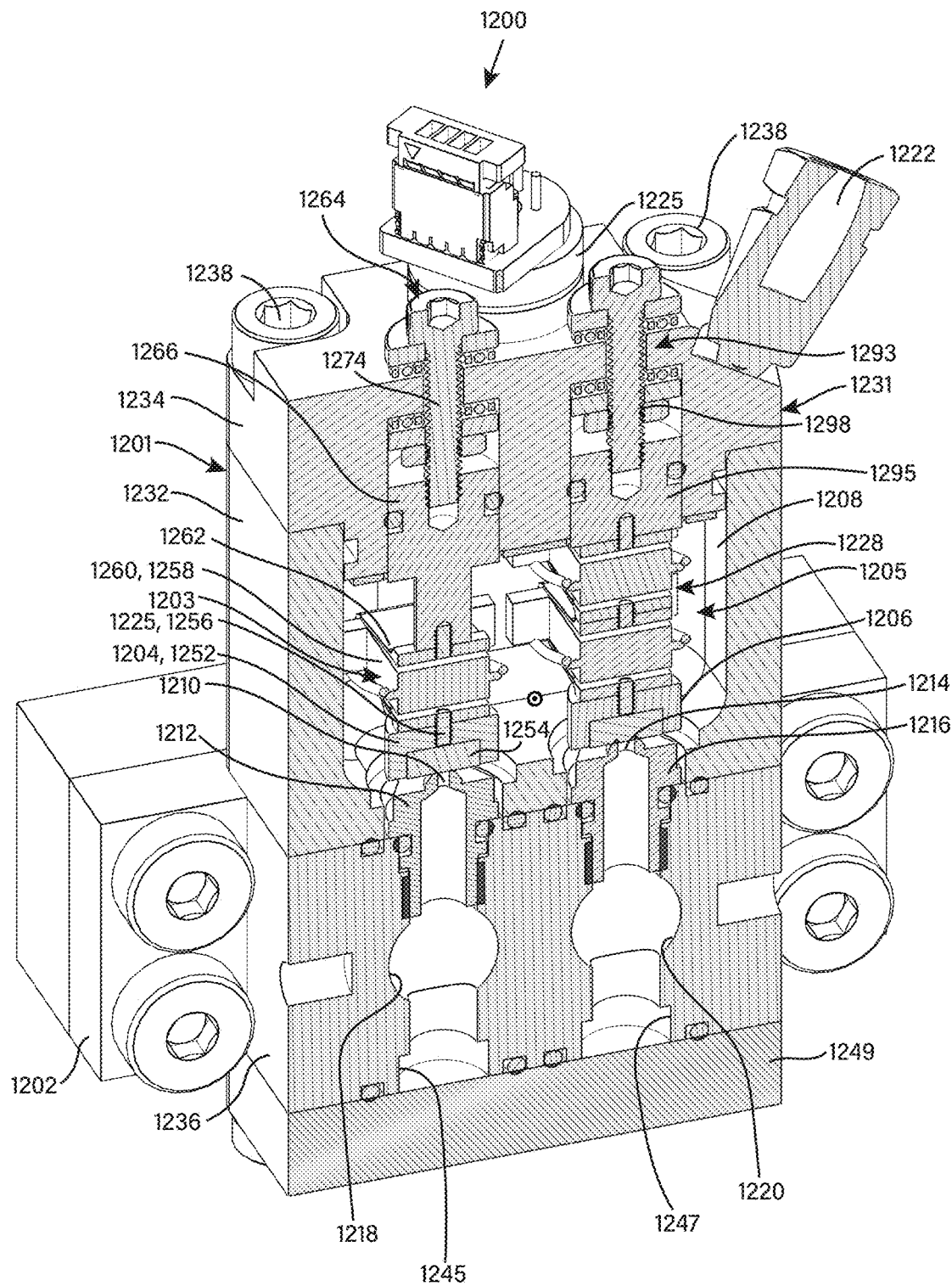
FIGS. 12B-12C are cross-sectional views of the electrohydraulic valve of FIG. 12A.
Figure 12C:
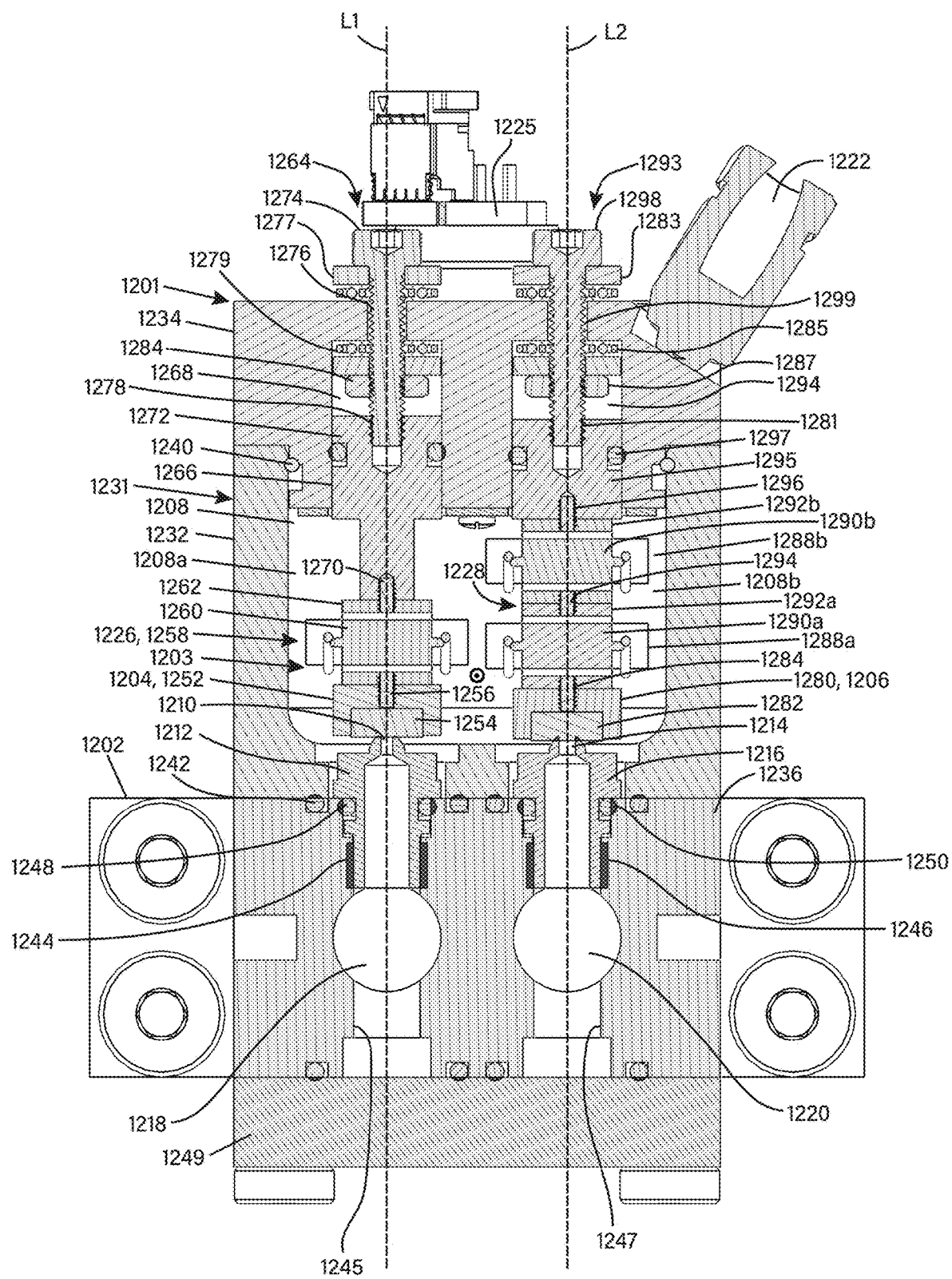

FIGS. 12A-12C illustrate an exemplary electrohydraulic valve 1200 including a valve unit 1201. The valve unit 1201 is disposed on a first side of a valve manifold 1202 having an inlet port 1218 and an outlet port 1220. The valve unit 1201 includes a common chamber 1208 containing a first valve 1203 that is operable to open or close an inlet orifice 1210 and a second valve 1205 that is operable to open or close an outlet orifice 1214. The inlet orifice 1210 is fluidly connected to the inlet port 1218 of the valve manifold 1202, and the outlet orifice 1214 is fluidly connected to the outlet port 1220 of the valve manifold 1202. The valve unit 1201 includes a metered port 1222 that is fluidly connected to the common chamber 1208. The metered port 1222 can be connected to a hydraulic actuator (e.g., a single-acting hydraulic cylinder). The valve unit 1201 can include a pressure transducer 1225 to measure pressure inside the common chamber 1208.

Figure 13:
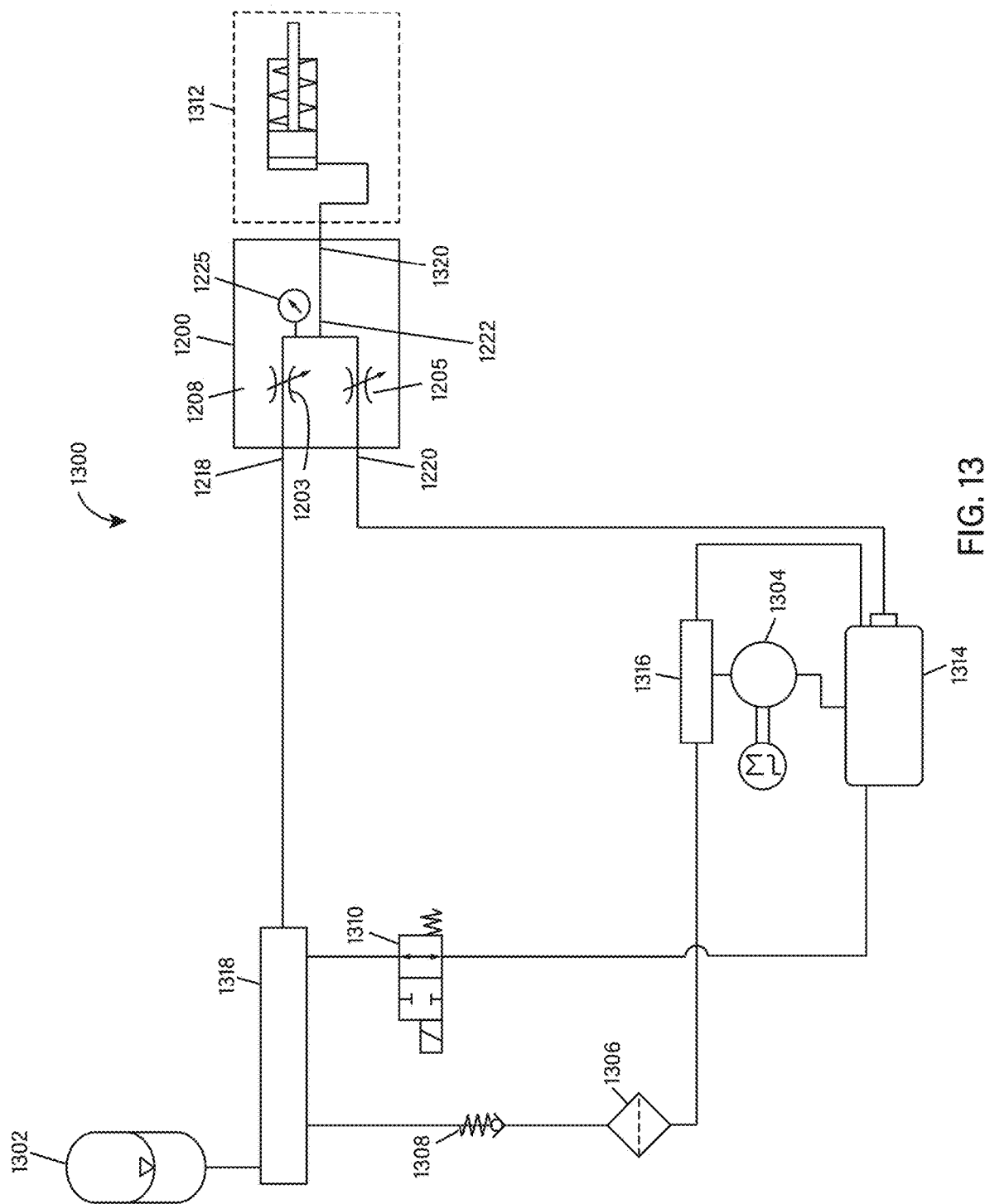
FIG. 13 is a circuit diagram of a hydraulic system using the electrohydraulic valve of FIG. 12A to operate a single-acting hydraulic cylinder.

FIG. 13 is a simplified circuit diagram of an example hydraulic system 1300 including the electrohydraulic valve 1200. The valve manifold inlet port 1218 (see FIGS. 12B-12C) can be fluidly connected to an accumulator 1302 through a main manifold 1318. The accumulator 1302 receives pressurized fluid (e.g., oil) from a pump 1304 having a suction end fluidly connected to a reservoir 1314. The hydraulic fluid pumped from the pump 1304 to the accumulator 1302 can pass through a directional valve 1316, a high pressure filter 1306, a check valve 1308, and the main manifold 1318. The hydraulic system 1300 can include a dump valve 1310 that is fluidly connected to the reservoir 1314. The dump valve 1310 can dump pressure in the accumulator 1302 when the hydraulic system 1300 is turned off. The valve unit metered port 1222 (see FIGS. 12B-12C) can be connected to a hydraulic actuator 1312 via a hydraulic line 1320. The valve manifold outlet port 1220 can be fluidly connected to the reservoir 1314.

The hydraulic system 1300 can operate in various modes. In a first mode, the first valve 1203 is open while the second valve 1205 is closed. In this mode, pressurized fluid from the accumulator 1302 can flow into the common chamber 1208 through the inlet port 1218 and through an inlet gap formed by the open first valve 1203. The pressurized fluid in the common chamber 1208 can be delivered to the hydraulic actuator 1312 through the metered port 1222 and hydraulic line 1320. The rate of flow of hydraulic fluid into the common chamber 1208 can be controlled based on a power requirement of the hydraulic actuator 1312. The power applied at the hydraulic actuator 1312 can be determined based on pressure measurements in the common chamber 1208 using the pressure transducer 1225. In a second mode, the first valve 1203 can be closed while the second valve 1205 is open. In this mode, fluid in the common chamber 1208 can be exhausted into the reservoir 1314 through an outlet gap formed by the open second valve 1205 and through the outlet port 1220. In a third mode, the first valve 1203 and the second valve 1205 can be open. In this mode, fluid can be circulated through the common chamber 1208, from the inlet port 1218, through an inlet gap formed by the open first valve 1203, through an outlet gap formed by the open second valve 1205, to the outlet port 1220.

Referring to FIGS. 12B and 12C, the valve unit 1200 can include a valve housing 1231 having a valve body 1232 and a valve cap 1234. The valve cap 1234 can be attached or integrally formed with a first end of the valve body 1232. A second end of the valve body 1232 can be positioned or mounted on a first side of a manifold block 1236 of the valve manifold 1202 such that the valve cap 1234 is in opposing relation to the first side of the manifold block 1236. The valve housing 1231 can be secured to the manifold block 1236 using any suitable method (e.g., using bolts 1238 that extend through holes in the valve cap 1234 and valve body 1232 into holes in the manifold block 1236).

The common chamber 1208 is defined within the valve body 1232 and extends between the opposing valve cap 1234 and first side of the manifold block 1236. One or more seal members (or gaskets) 1240 can be arranged at an interface between the valve body 1232 and the valve cap 1234 to prevent common chamber fluid leakage through that interface. One or more seal members (or gaskets) 1242 can be arranged at an interface between the manifold block 1236 and the valve body 1232 to prevent common chamber fluid leakage from that interface.

The manifold block 1236 includes the inlet port 1218 and the outlet port 1220 of the valve manifold 1202. The manifold block 1236 can include a first bore 1244 extending to a first portion 1208a of the common chamber 1208 and connected to the inlet port 1218. The manifold block 1236 can include a second bore 1246 extending to a second portion 1208b of the common chamber 1208 and connected to the outlet port 1220.

The manifold block 1236 includes the inlet port 1218. The manifold block 1236 can include a first bore 1244 connected to the inlet port 1218 and extending to a first portion 1208a of the common chamber 1208. The valve unit 1201 can include an inlet nozzle 1212 having a tip portion including the inlet orifice 1210. The inlet nozzle 1212 can be mounted in the first bore 1244, with the tip portion of the inlet nozzle 1212 including the inlet orifice 1210 extending into the chamber portion 1208a. One or more seal members (or gaskets) 1248 can be arranged at an interface between the inlet nozzle 1212 and the wall of the first bore 1244 to prevent common chamber fluid leakage from that interface.

The manifold block 1236 includes the outlet port 1220. The manifold block can include a second bore 1246 connected to the outlet port 1220 and extending to a second portion 1208b of the common chamber 1208. The valve unit 1201 can include an outlet nozzle 1216 having a tip portion including the outlet orifice 1214. The outlet nozzle 1216 can be mounted in the second bore 1246, with the tip portion of the outlet nozzle 1246 including the outlet orifice 1214 extending into the chamber portion 1208b. One or more seal members (or gaskets) 1250 can be arranged at an interface between the outlet nozzle 1216 and the wall of the second bore 1246 to prevent common chamber fluid leakage from that interface.

The manifold block 1236 can include third and fourth bores 1245, 1247 opposite the first and second bores 1244, 1246, respectively. The third and fourth bores 1245, 1247 can accommodate additional inlet and outlet nozzles when two valve units are disposed on opposite sides of the manifold block 1236 (see FIG. 14B). When the third and fourth bores 1245, 1247 are not used, an end cap 1249 can be mounted to close the third and fourth bores 1245, 1247 and prevent fluid from pouring out of the valve manifold through the third and fourth bores 1245, 1247.

The first valve 1203, which is disposed within the chamber portion 1208a, includes a first valve plug 1204 (or first valve plunger) that is movable to close or open the inlet orifice 1210. When the inlet orifice 1210 is open, a fluid communication path is formed that extends from the inlet port 1218 to the common chamber 1208, passing through the inlet orifice 1210. The first valve 1203 includes a first valve actuator 1226 that is coupled to the first valve plug 1204 and operable to move the first valve plug 1204 between closed and open positions.

The second valve 1205, which is disposed within the chamber portion 1208*b*, includes a second valve plug 1206 that is movable to close or open the outlet orifice 1214. When the outlet orifice 1214 is open, a fluid communication path is formed that extends from the common chamber 1208 to the outlet port 1220, passing through the outlet orifice 1214. The second valve 1205 includes a second valve actuator 1228 that is coupled to the second valve plug 1206 and operable to move the second valve plug 1206 between closed and open positions.

The first valve plug 1204 is disposed in the chamber portion 1208*a* in opposing relation to the inlet orifice 1210. The first valve plug 1204 can be axially aligned with the inlet nozzle 1212 (e.g., along an axial axis L1). The first valve plug 1204 can include a holder 1252 and a pad 1254 fitted within an opening in the holder 1252. The holder 1252 can be coupled to the first valve actuator 1226 (e.g., by a threaded pin 1256). The pad 1254 is exposed at a distal end of the first valve plug 1204 and is positioned in opposing relation to the inlet orifice 1210. The pad 1254 can have a flat disc shape, for example. The pad 1254 has a size (e.g., diameter) that is larger than a size of the inlet orifice 1210 so that the pad 1254 can cover the inlet orifice 1210 when the first valve plug 1204 is biased against the tip portion of the inlet nozzle 1212. In some examples, the inlet orifice 1210 can have a diameter in a range from 600 microns to 700 microns. The pad 1254 can be made of a material that can form a seal against the tip portion of the inlet nozzle 1212 (e.g., PTFE).

The second valve plug 1206 is disposed in the chamber portion 1208*b* in opposing relation to the outlet orifice 1214. The second valve plug 1206 can be axially aligned with the outlet nozzle 1216 (e.g., along an axial axis L2, which can be parallel to the axial axis L1). The second valve plug 1206 can include a holder 1280 and a pad 1282 fitted within an opening in the holder 1280. The holder 1280 can be coupled to the second valve actuator 1228 (e.g., by a threaded pin 1284). The pad 1282 is exposed at a distal end of the second valve plug 1206 and is positioned in opposing relation to the outlet orifice 1214. The pad 1282 can have a flat disc shape, for example. The pad 1282 has a size (e.g., diameter) that is larger than the diameter of the outlet orifice 1214 so that the pad 1282 can cover the outlet orifice 1214 when the second valve plug 1206 is biased against the tip portion of the outlet nozzle 1216. In some examples, the outlet orifice 1214 can have a diameter in a range from 600 microns to 900 microns. The pad 1282 can be made of a material that can form a seal against the tip portion of the outlet nozzle 1216 (e.g., PTFE).

In some examples, the first valve actuator 1226 can include a piezo actuator 1258 (or more than one piezo actuator) that can deform axially in response to an applied electrical field (e.g., an applied voltage or electrical current). The axial deformation of the piezo actuator 1258 can be translated to axial movement of the first valve plug 1204 within the chamber portion 1208*a*. In one example, the piezo actuator 1258 can be an amplified piezo actuator including a piezo element 1260 mounted within a flexure housing 1262. The first valve plug 1204 can be coupled to the flexure housing 1262 (e.g., by the threaded pin 1256). When an electrical field is applied to the piezo actuator 1258, the piezo element 1260 will elongate laterally (e.g., in a direction transverse to the axial axis L1), causing the flexure housing 1262 to shorten axially (e.g., in a direction parallel to the axial axis L1). The amount by which the flexure housing 1262 shortens is proportional to the applied electrical field and determines the axial displacement of the first valve plug 1204 in a direction parallel to the axial axis L1.

In some examples, the second valve actuator 1228 can include one or more piezo actuators. In the illustrated example, the second valve actuator 1228 includes two piezo actuators 1288*a*, 1288*b*. Each piezo actuator 1288*a*, 1288*b* can deform axially in response to an applied electrical field (e.g., an applied voltage or electrical current). The combined axial deformations of the piezo actuators 1288*a*, 1288*b* can be translated to axial movement of the second valve plug 1206 within the chamber portion 1208*b*. In one example, each piezo actuator 1288*a*, 1288*b* can be an amplified piezo actuator including a piezo element 1290*a*, 1290*b* mounted within a respective flexure housing 1292*a*, 1292*b*. The flexure housings 1292*a*, 1292*b* can be coupled together (e.g., using a threaded pin 1294). The second valve plug 1206 can be coupled to the adjacent piezo actuator 1288*a* (e.g., using the threaded pin 1284).

When an electrical field is applied to each of the piezo actuators 1288*a*, 1288*b*, the respective piezo actuator 1288*a*, 1288*b* will elongate laterally (e.g., in a direction transverse to the axial axis L2), causing the respective flexure housing 1292*a*, 1292*b* to shorten axially (e.g., in a direction parallel to the axial axis L2). The amount by which each flexure housing 1292*a*, 1292*b* shortens is proportional to the electrical field applied to the respective piezo actuator 1288*a*, 1288*b*. The axial displacement of the second valve plug 1228 in a direction parallel to the axial axis L2 is determined by a combination of the amounts by which the flexure housings 1292, 1292 are shortened axially.

The two piezo actuators 1288*a*, 1288*b* can provide a higher stroke compared to a single piezo actuator, which can assist in exhausting fluid from the common chamber 1208 to the outlet port 1220 through the outlet orifice 1214. In some examples, the second valve actuator 1228 may have a single piezo actuator that is configured to provide sufficient stroke to exhaust fluid from the common chamber 1208 to the outlet port 1220. In some examples, a combination of a single piezo actuator and a relatively large outlet orifice 1214 may be used to exhaust fluid from the chamber 1208 to the outlet port 1220.

In some examples, the valve cap 1234 can include an electrical feedthrough 1229 (see FIGS. 12G and 12H) that extends into the common chamber 1208 and is connected to the valve actuators 1226, 1228. The electrical feedthrough 1229 can be used to provide electrical power to the piezo elements of the piezo actuators 1258, 1288*a*, 1288*b*.

The first valve 1203 can have a closed position in which the first valve plug 1204 is biased against the tip portion of the inlet nozzle 1212 and the inlet orifice 1210 is closed or sealed (e.g., the pad 1254 covers the inlet orifice 1210). The first valve 1203 can have an open position (or a range of open positions) in which the first valve plug 1204 is lifted from the tip portion of the inlet nozzle 1212 and the inlet orifice 1210 is open (e.g., exposed to the common chamber 1208). An inlet gap G1 (shown in FIG. 12D) is formed between the first valve plug 1204 and the inlet orifice 1210 when the first valve 1203 is in an open position. The size of the inlet gap G1 and the pressure of the fluid at the inlet port 1218 determine the rate at which fluid can flow into the common chamber 1208 through the inlet orifice 1210. The closed position of the first valve 1203 can correspond to a state in which electrical field is not applied to the piezo actuator 1258.

The second valve 1205 can have a closed position in which the second valve plug 1206 is biased against the tip portion of the outlet nozzle 1216 and the outlet orifice 1214 is closed or sealed (e.g., the pad 1282 covers the outlet orifice). The second valve 1205 can have an open position (or a range of open positions) in which the second valve plug 1206 is lifted from the tip portion of the outlet nozzle 126 and the outlet orifice 1214 is open (e.g., exposed to the common chamber 1208). An outlet gap G2 is formed between the second valve plug 1206 and the outlet orifice 1214 when the second valve 1205 is in an open position. The size of the outlet gap G2 and the pressure of the fluid in the common chamber 1208 determine the rate at which fluid can flow to the outlet port 1220 through the outlet orifice 1214. The closed position of the second valve 1205 can correspond to a state in which electrical field is not applied to either of the piezo actuators 1288*a*, 1288*b*.

Referring to FIG. 12C, the first valve 1203 can include a stroke adjustment 1264 that can be used to adjust a position of the first valve plug 1204 after the valve unit 1201 is assembled onto the valve manifold 1202. For example, the position of the first valve plug 1204 can be adjusted such that the first valve plug 1204 contacts the tip portion of the inlet nozzle 1212 to close the inlet orifice 1210 when electrical field is not applied to the piezo actuator 1258.

The valve cap 1234 can include a first bore 1268, which can be axially aligned with the first bore 1244 in the manifold block 1236. The stroke adjustment 1264 can include an adjustment head 1266 received in the first bore 1268. The adjustment head 1266 is coupled to the piezo actuator 1258 (e.g., the adjustment head 1266 can be coupled to the flexure housing 1262 of the piezo actuator 1258 by a threaded pin 1270). A seal member (or gasket) 1272 can be arranged between the adjustment head 1266 and a wall of the first bore 1268 to prevent leakage of chamber fluid through a path between the bore 1268 and the adjustment head 1266.

The stroke adjustment 1264 can include an adjusting screw 1274 extending through an opening 1276 in the valve cap 1234 into the first bore 1268 and further into a threaded opening 1278 in the adjustment head 1266. The adjusting screw 1274 is supported to rotate freely relative to the first bore 1268 by bearings 1277, 1279 and restrained axially by a nut 1284 threaded onto the screw. When the adjusting screw 1274 is rotated, the adjustment head 1266 can travel axially along the adjusting screw 1274 using the threaded interface between the threaded opening 1278 and the adjusting screw 1274. The adjusting screw 1274 can be rotated until stopped by contact between the first valve plug 1204 and the tip portion of the inlet nozzle 1212.

The second valve 1205 can include a stroke adjustment 1293 that can be used to adjust a position of the second valve plug 1206 after the valve unit 1201 is assembled onto the valve manifold 1202. For example, the position of the second valve plug 1206 can be adjusted such that the second valve plug 1206 contacts the tip portion of the outlet nozzle 1216 to close the outlet orifice 1214 when electrical field is not applied to the piezo actuators 1288*a*, 1288*b*.

The valve cap 1234 can include a second bore 1294, which can be axially aligned with the second bore 1246 in the manifold block 1236. The stroke adjustment 1293 can include an adjustment head 1295 received in the second bore 1293. The adjustment head 1295 is coupled to the piezo actuator 1288*b* (e.g., the adjustment head 1295 can be coupled to the flexure housing 1292*b* using a threaded pin 1296). A seal member (or gasket) 1297 can be arranged between the adjustment head 1295 and a wall of the second bore 1294 to prevent leakage of chamber fluid through a path between the bore 1292 and the adjustment head 1295.

The stroke adjustment 1293 can include an adjusting screw 1298 extending through an opening 1299 in the valve cap 1234 into the second bore 1294 and further into a threaded opening 1281 in the adjustment head 1295. The adjusting screw 1298 is supported to rotate freely relative to the second bore 1294 by bearings 1283, 1285 and restrained axially by a nut 1287 threaded onto the screw. When the adjusting screw 1298 is rotated, the adjustment head 1295 can travel axially along the adjusting screw 1298 using the threaded interface between the threaded opening 1281 and the adjusting screw 1298. The adjusting screw 1298 can be rotated until stopped by contact between the second valve plug 1206 and the tip portion of the outlet nozzle 1216.

Figure 12D:
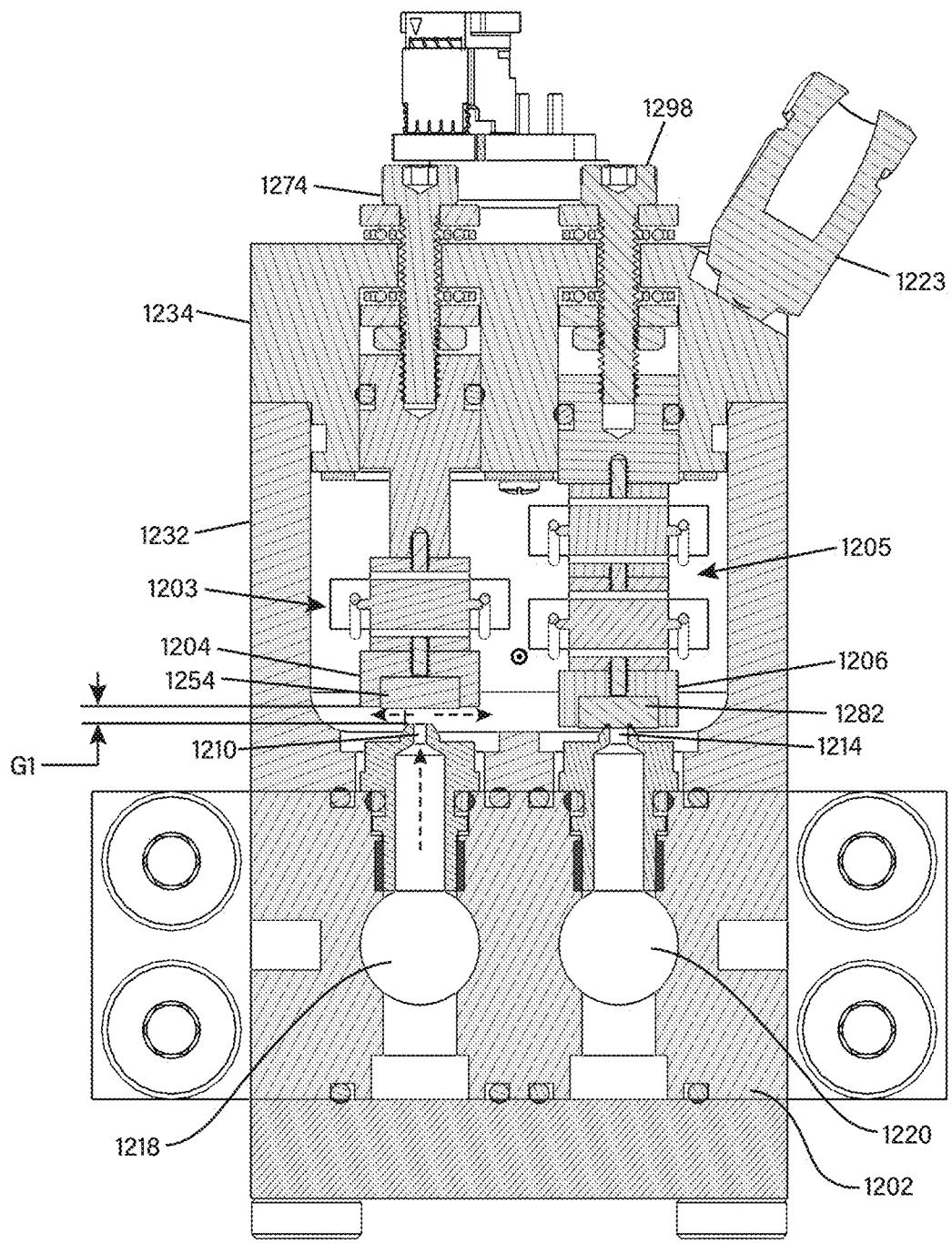
FIGS. 12D-12F are cross-sectional views of the electrohydraulic valve of FIG. 12A illustrating valves in the valve unit in different positions.
Figure 12E:
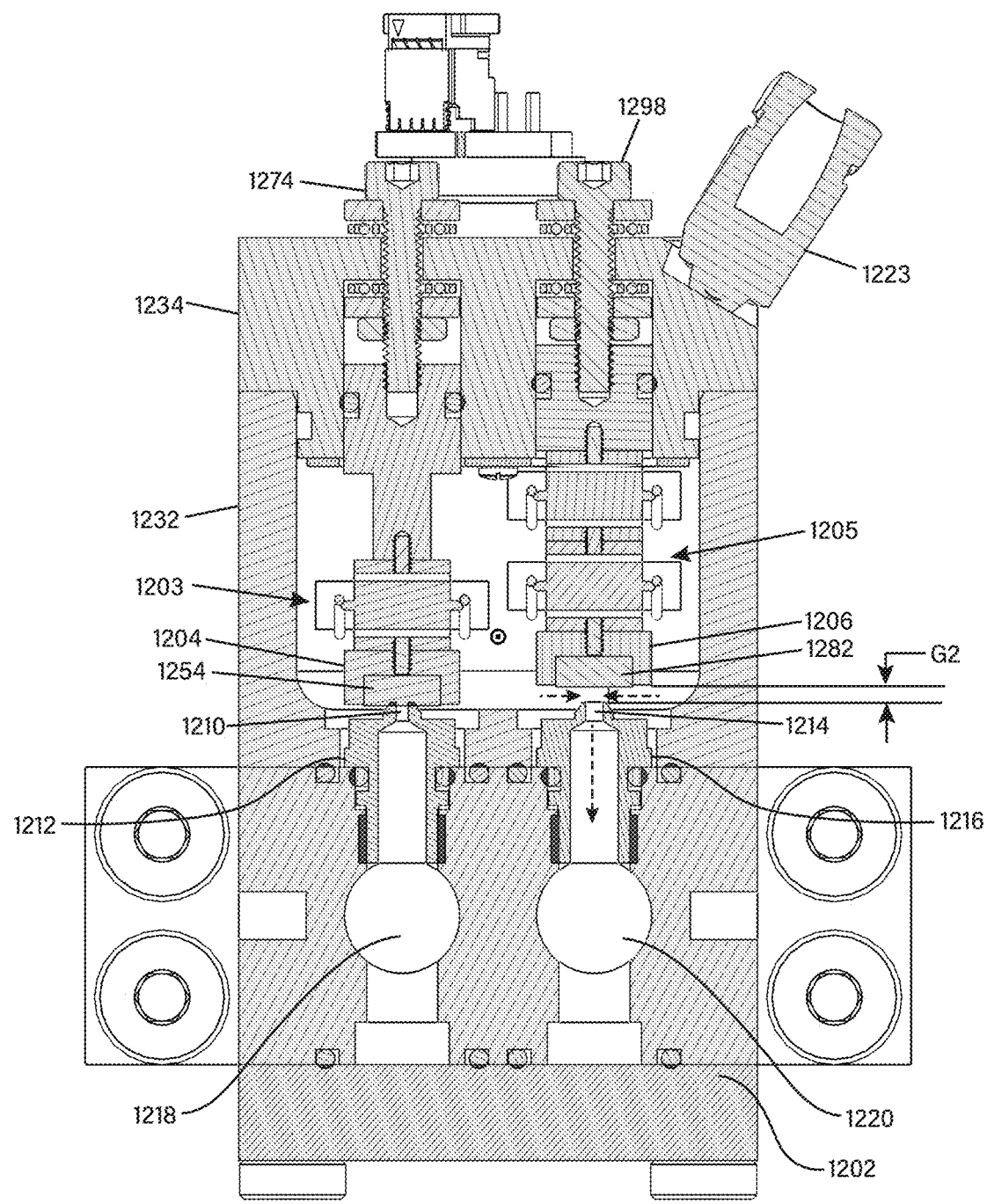
Figure 12F:
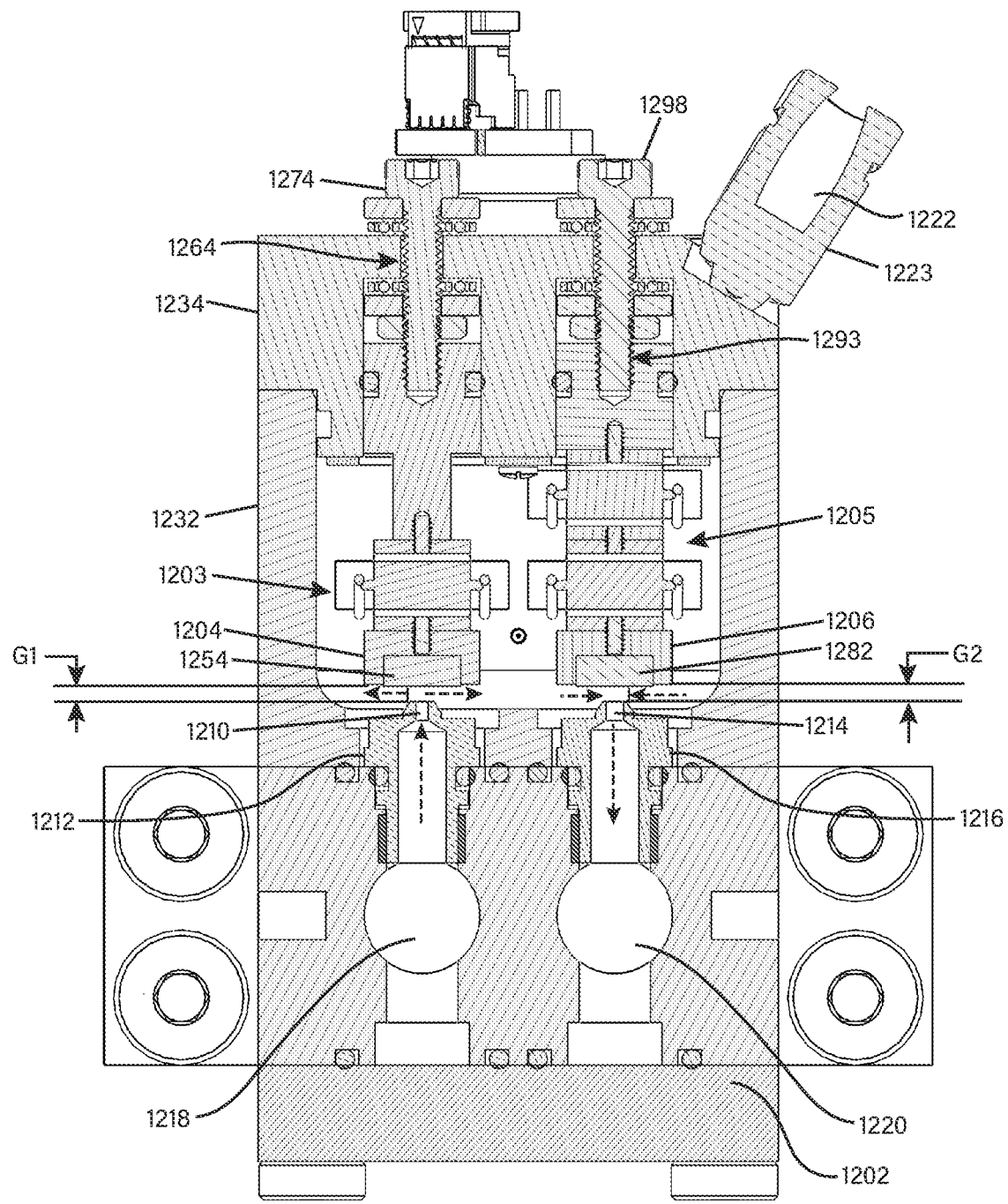

When the valve 1200 is initially assembled, the valve plugs 1204, 1206 can be offset (or axially displaced) from the respective tip portions of the nozzles 1212, 1216 while electrical field is not applied to the piezo actuators 1258, 1288*a*, 1288*b* so that the inlet orifice 1210 and the outlet orifice 1214 are open to the common chamber 1208 as shown in FIG. 12F. The inlet port 1218 can be connected to a fluid supply (e.g., the accumulator 1302 in FIG. 13), and the outlet port 1218 can be connected to a fluid return (e.g., the reservoir 1314 in FIG. 13). Pressurized fluid received in the inlet port 1218 can enter the chamber 1208 through the inlet orifice 1210 and fill the chamber 1208. Since the second valve plug 1206 is offset from the outlet nozzle 1216 at this stage, fluid can drain from the chamber 1208 into the outlet port 1220 through the outlet orifice 1214. The fill rate of the chamber 1208 can be faster than the rate at which fluid is drained from the chamber 1208.

After filling the chamber 1208 with the fluid from the inlet port 1218, while electrical field is not applied to the piezo actuator 1258, the stroke adjustment 1264 can be operated to move the first valve plug 1204 to a position where the first valve plug 1204 contacts the tip portion of the inlet nozzle 1212 and seals or closes the inlet orifice 1210. While electrical field is not applied to the piezo actuators 1288*a*, 1288*b*, the stroke adjustment 1293 can be operated to move the second valve plug 1206 to a position where the second valve plug 1206 contacts the tip portion of the outlet nozzle 1216 and seals or closes the outlet orifice 1214. After these adjustments, electrical fields can be selectively applied to the piezo actuators 1258, 1288*a*, 1288*b* to displace the valve plugs 1204, 1206 from the respective nozzles 1212, 1216 and open the respective orifices 1210, 1214.

The valve unit 1201 can have an intake stroke and an exhaust stroke. During the intake stroke, the valve unit 1201 can receive pressurized fluid in the common chamber 1208. If the valve unit 1201 is connected to a hydraulic actuator, the pressurized fluid in the common chamber 1208 can be delivered to the hydraulic actuator through the metering port 1222 of the valve unit 1201. During the exhaust stroke, fluid can be exhausted from the common chamber 1208. The stroke cycle can be repeated as needed to operate the hydraulic actuator.

The intake stroke of the valve unit 1201 can include opening the inlet orifice 1210 (e.g., controlling the first valve 1203 to an open position) and closing the outlet orifice 1214 (e.g., controlling the second valve 1205 to a closed position) to allow pressurized fluid received at the inlet port 1218 of the valve manifold to enter into the common chamber 1208 and fill the chamber 1208 (see FIG. 12D). The rate at which fluid enters the chamber 1208 will depend on the size of inlet gap G1 between the first valve plug 1204 and the tip portion of the inlet nozzle 1212 (or the inlet orifice 1210) and the pressure of the fluid. The amount of electrical field applied to the piezo actuator 1258 determines the size of the inlet gap G1. In some examples, the inlet gap can be in a range from 65 to 70 microns. The fluid received in the common chamber 1208 can exit the common chamber 1208 through the metered port 1222. In some examples, the inlet gap may support a flow rate at the metered port of up to 0.29 LPM.

The exhaust stroke of the valve unit 1201 can include closing the inlet orifice 1210 (e.g., controlling the first valve 1203 to the closed position) and opening the outlet orifice 1214 (e.g., controlling the second valve 1205 to the open position). The inlet orifice 1210 can be closed, for example, by turning off the electrical field applied to the piezo actuator 1258 so that the first valve plug 1204 returns to a position in which it contacts the tip portion of the inlet nozzle 1212 and seals the inlet orifice 1210. The second orifice 1214 can be opened by applying electrical fields to the piezo actuators 1288a, 1288b to axially displace the second valve plug 1206 from the outlet nozzle 1216 and thereby create an outlet gap G2 between the second valve plug 1206 and the tip portion of the outlet nozzle 1216 (or outlet orifice 1214). The amount of electrical fields applied to the piezo actuators 1288a, 1288b determines the size of the outlet gap G2. In some examples, the outlet gap can be in a range from 130 to 140 microns. Fluid in the common chamber 1208 can flow through the outlet gap and outlet orifice 1214 to the outlet port 1220.

Figure 12G:
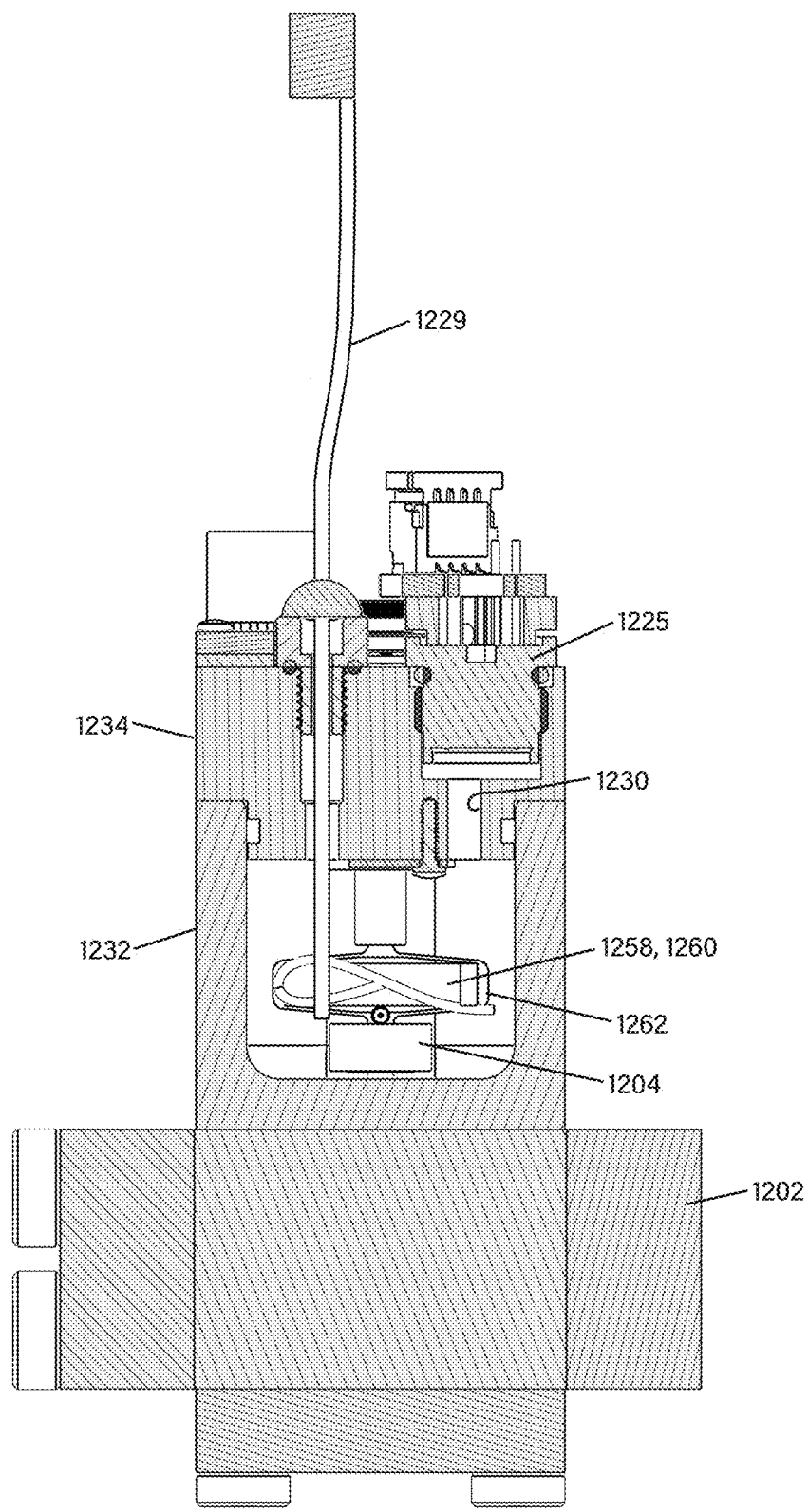
FIG. 12G is a cross-sectional view of the electrohydraulic valve of FIG. 12A illustrating an electrical feedthrough and pressure transducer coupled to a cap of the valve unit.
Figure 12H:
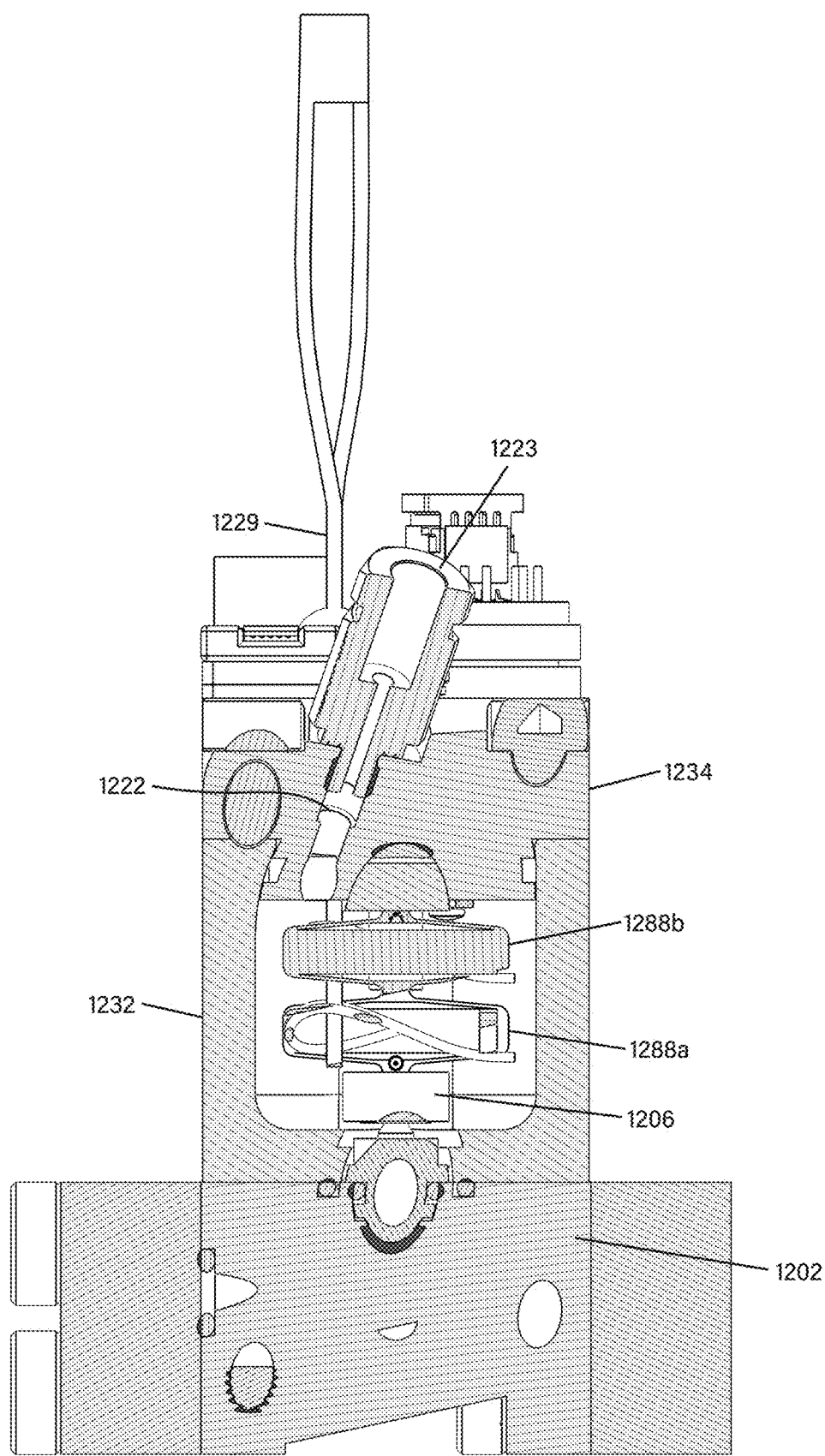
FIG. 12H is a cross-sectional view of the electrohydraulic valve of FIG. 12A illustrating a metering port formed in a cap of the valve unit.

Referring to FIGS. 12G and 12H, in some examples, the metering port 1222 can be an opening in the valve cap 1234 that extends to the common chamber 1208 and that is fitted with a pipe fitting 1223. A hydraulic line (e.g., hose) for a hydraulic actuator can be connected to the pipe fitting 1223. In some examples, the pressure transducer 1225 and associated measuring circuit can be mounted on the valve cap 1234. The valve cap 1234 can include a channel 1230 that extends from the pressure transducer 1225 to the common chamber 1208 and allows the pressure transducer 1225 to sense pressure changes in the common chamber 1208.

The pressure transducer 1225 along with the piezo actuators 1258, 1288a, 1288b can enable impedance control of the force applied at a hydraulic actuator fluidly connected to the metering port 1222. For example, the pressure measurements made by the pressure transducer 1225 indicate the pressure in the common chamber 1208, which is the same as the pressure in a fluid line connecting the hydraulic actuator to the metering port 1222 (e.g., the fluid line 1320 in FIG. 13). Using the pressure measurements, the force applied at the output of the hydraulic actuator can be determined and used for impedance control. The valve unit 1201 acts as a proportional valve because the inlet gap G1 between the inlet orifice 1210 and the first valve plug 1204 can be varied in small amounts by control of the electrical field applied to the piezo actuator 1258.

Figure 14A:
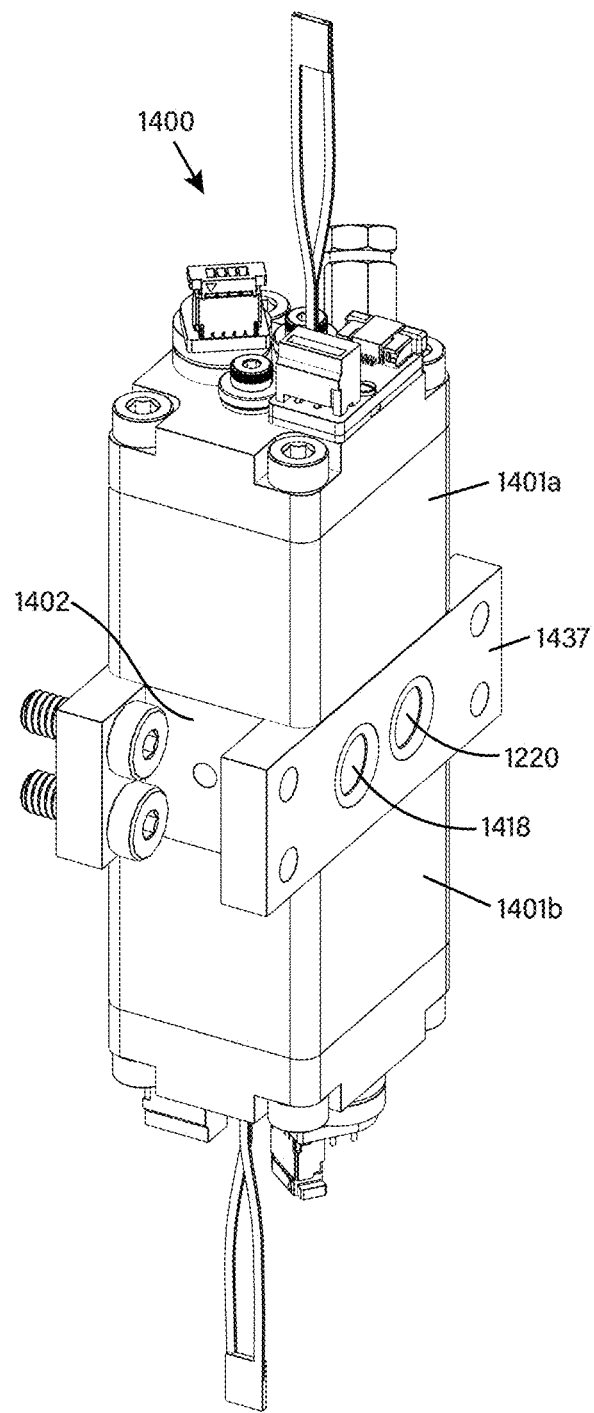
FIG. 14A is a perspective view of an electrohydraulic valve including two valve units.
Figure 14B:
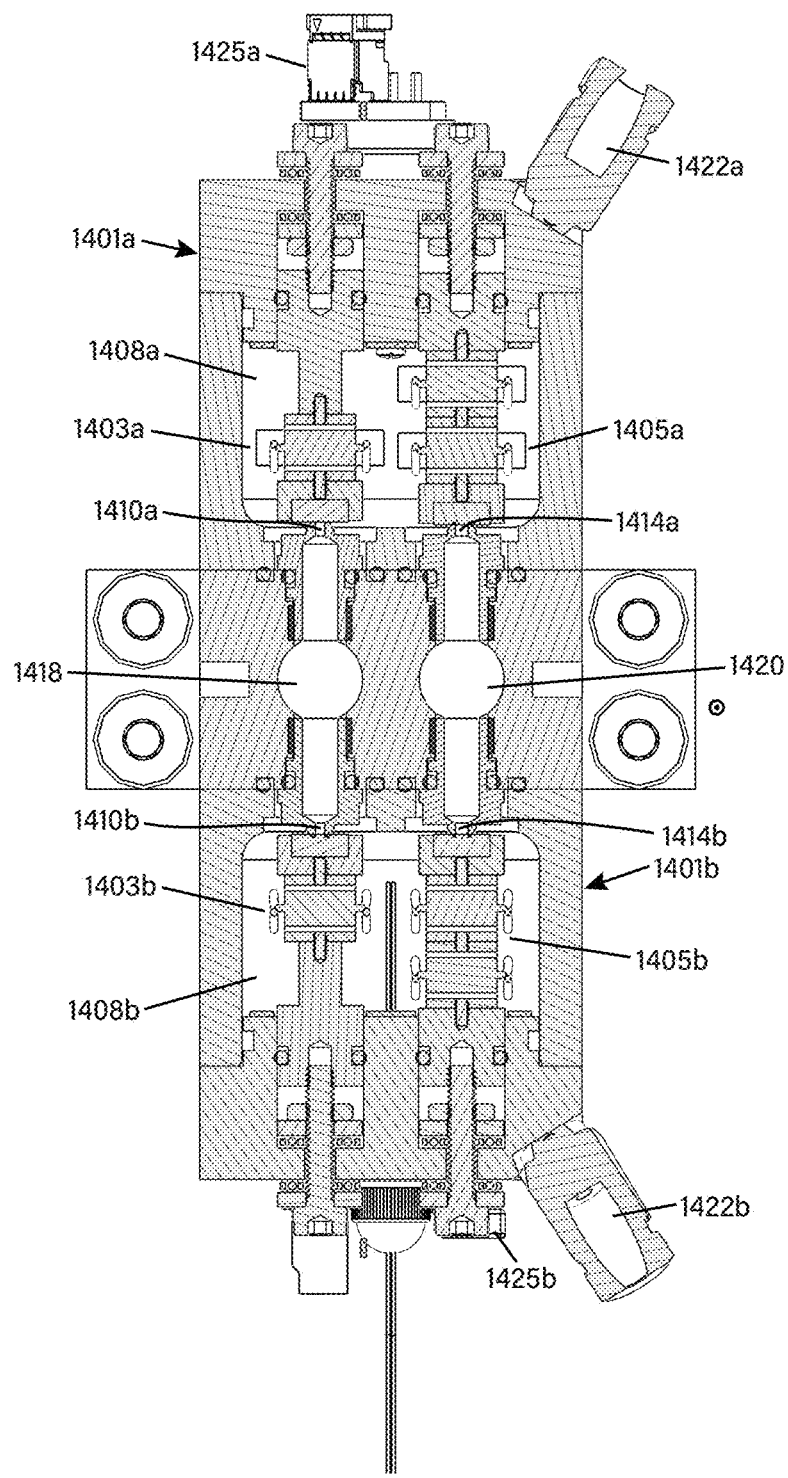
FIG. 14B is a cross-sectional view of the electrohydraulic valve of FIG. 14A.

In some examples, as illustrated in FIGS. 14A and 14B, an electrohydraulic valve 1400 can include two valve units 1401a and 1401b disposed on opposite sides of a valve manifold 1402. Each of the valve units 1401a, 1401b can have any of the features and functionalities described for the valve unit 1201 (FIGS. 12A-12H). The valve manifold 1402 can have any of the features and functionalities described for the valve manifold 1202 (FIGS. 12A-12H). For example, each of the valve units 1401a, 1401b can include a common chamber 1408a, 1408b containing a first valve 1403a, 1403b that is operable to open or close an inlet orifice 1410a, 1410b and a second valve 1405a, 1405b that is operable to open or close an outlet orifice 1414a, 1414b. Each valve unit 1401a, 1401b can include a metered port 1422a, 1422b that is fluidly connected to the respective common chamber 1408a, 1408b. Each of the metered ports 1422a, 1422b can be connected to a respective hydraulic actuator (e.g., a single-acting hydraulic cylinder), or both metered ports 1422a, 1422b can be connected to the same hydraulic actuator (e.g., a double-acting hydraulic cylinder). Each valve unit 1401a, 1401b can have a pressure transducer 1425a, 1425b for pressure measurements in the respective common chamber 1408a, 1408b. Each valve unit 1401a, 1401b can have electrical feedthroughs for the valve actuators, stroke adjustments, and other features and functionalities described for the valve unit 1201. The valve manifold 1402 can have an inlet port 1418 that is fluidly connected to the inlet orifices 1410a, 1410b and an outlet port 1420 that is fluidly connected to the outlet orifices 1414a, 1414b.

Figure 14C:
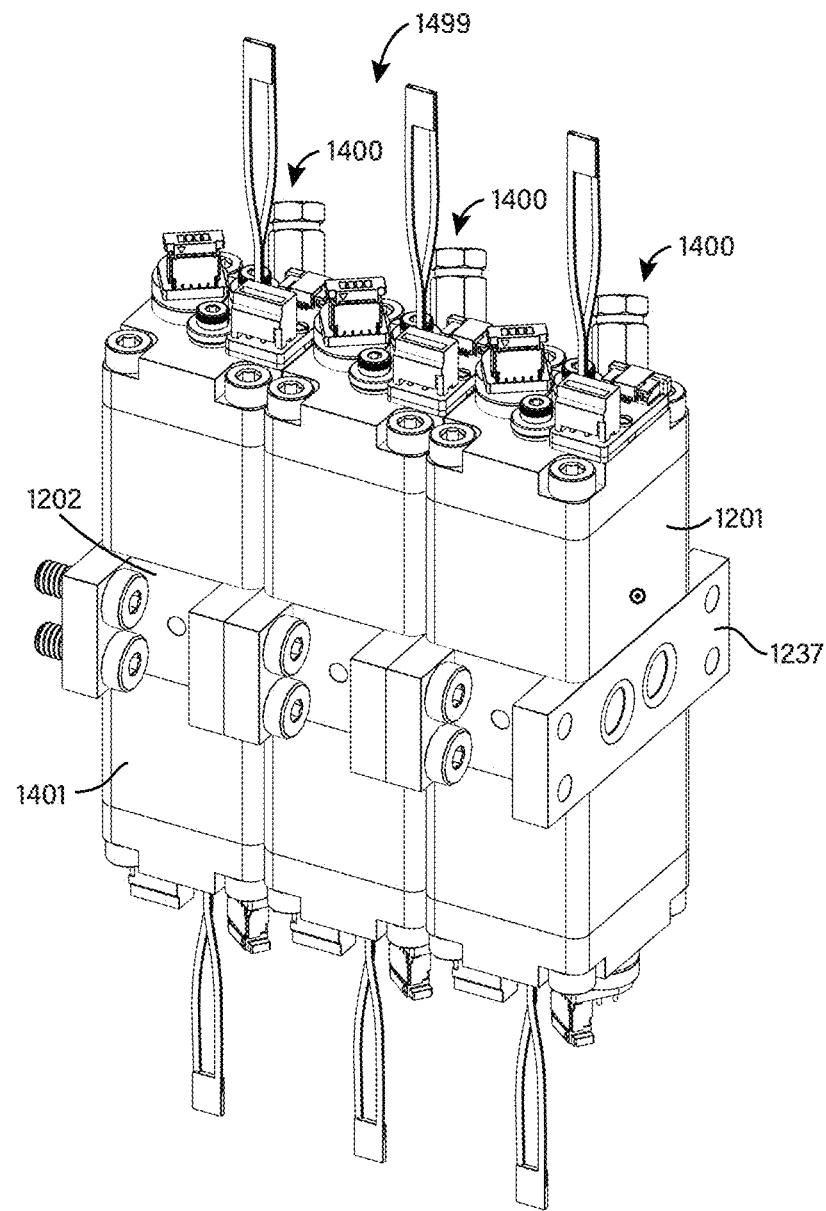
FIG. 14C is a perspective view of a valve pack including a multiple of the electrohydraulic valve of FIG. 14A.

FIG. 14C illustrates a valve pack 1499 including a plurality of electrohydraulic valves 1400 connected together in series. Three electrohydraulic valves 1400 are illustrated. However, the number of electrohydraulic valves 1400 that can be included in the valve pack 1500 is not limited to three. In general, the number of electrohydraulic valves 1400 that can be included in the valve pack can depend on the number and type of hydraulic actuators to be connected to the valve pack. For example, a valve pack having a sufficient number of electrohydraulic valve assemblies to operate a robot hand (906 in FIG. 9), which can include a combination of single-acting and double-acting hydraulic cylinders to articulate its degrees of freedom, can be configured. The electrohydraulic valves 1400 can be connected together using the flange members 1437 of the valve manifolds 1402.

Figure 15:
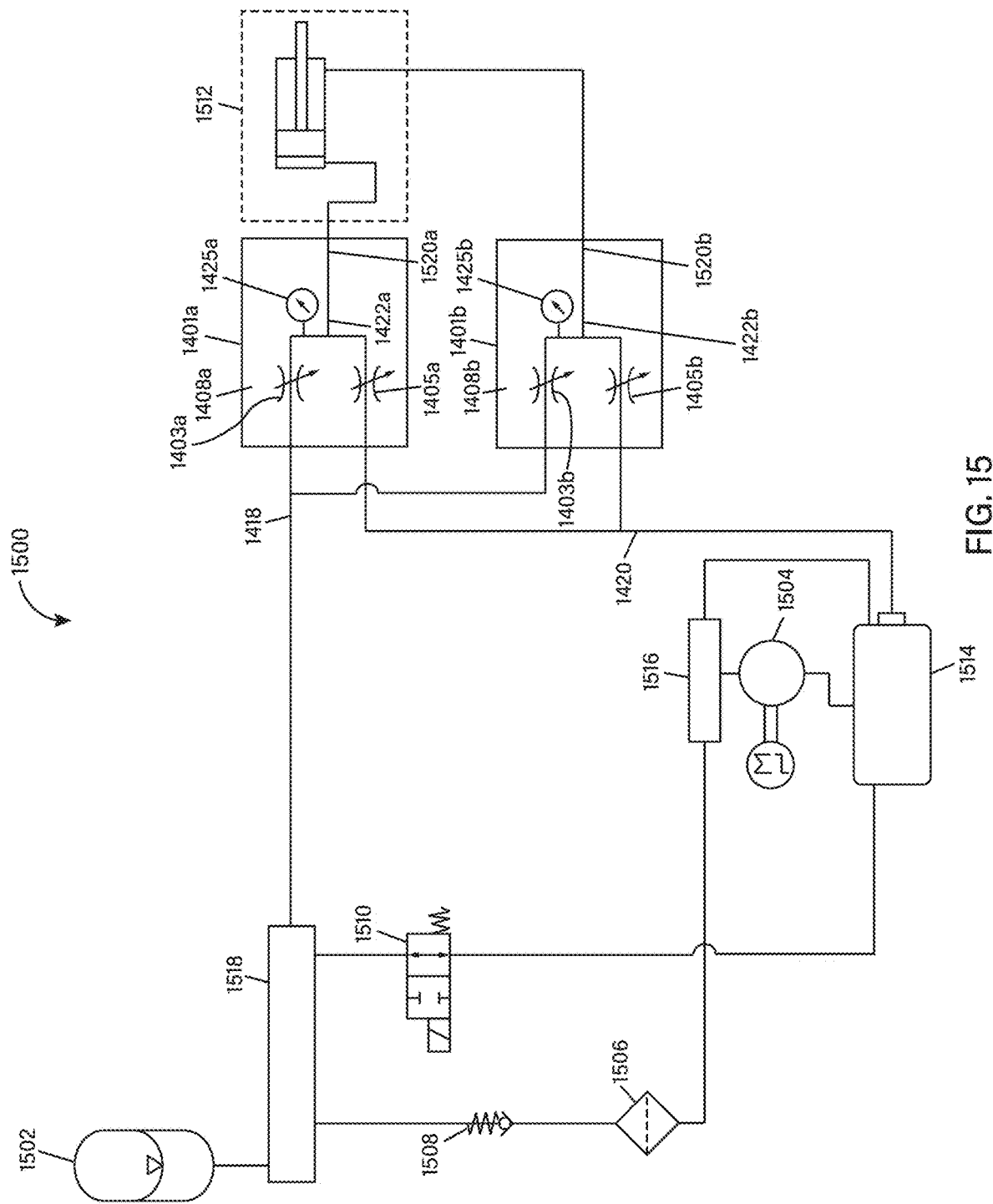
FIG. 15 is a circuit diagram of a hydraulic system using the electrohydraulic valve of FIG. 14A to operate a double-acting hydraulic cylinder.

FIG. 15 is a simplified circuit diagram of an example hydraulic system 1500 using the electrohydraulic valve 1400 to deliver fluid to a double-acting hydraulic cylinder 1512. The valve manifold inlet port 1418 (which is fluidly connected to the inlet orifices 1410a, 1410b as shown in FIG. 14B) can be fluidly connected to an accumulator 1502 through a main manifold 1518. The accumulator 1502 receives pressurized fluid (e.g., oil) from a pump 1504 having a suction end fluidly connected to a reservoir 1514. The hydraulic fluid from the pump 1504 to the accumulator 1502 can pass through a directional valve 1516, a high pressure filter 1506, a check valve 1508, and the main manifold 1518. The hydraulic system 1500 can include a dump valve 1510 that is fluidly connected to the reservoir 1514. The dump valve 1510 can dump pressure in the accumulator 1302 when the hydraulic system is turned off. The metered port 1422a of the valve unit 1401a can be connected to one side of the hydraulic cylinder 1512 via a hydraulic line 1520a, and the metered port 1422b of the valve unit 1401b can be connected to the other side of the hydraulic cylinder 1512 via a hydraulic line 1520b. The valve manifold outlet port 1420 (which is fluidly connected to the outlet orifices 1414a, 1414b as shown in FIG. 14B) can be fluidly connected to the reservoir 1514.

The various implementations described herein may include, or be combined with, any or all of the systems, devices, and methods described in U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Non-Provisional patent application Ser. No. 17/217,650 (Publication No. US 2021-0307170 A1), and/or U.S. Non-Provisional patent application Ser. No. 17/386,877, as well as U.S. Non-Provisional patent application Ser. No. 17/749,536, U.S. Non-Provisional patent application Ser. No. 17/833,998, U.S. Non-Provisional patent application Ser. No. 17/863,333, U.S. Non-Provisional patent application Ser. No. 17/867,056, U.S. Non-Provisional patent application Ser. No. 17/871,801, U.S. Non-Provisional patent application Ser. No. 17/976,665, and/or U.S. Provisional Patent Application Ser. No. 63/342,414, each of which is incorporated herein by reference in its entirety.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

ADDITIONAL EXAMPLES

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A miniaturized hydraulic valve comprising: a valve body, the valve body comprising an inlet and an outlet; a fluid path through the valve body, the fluid path able to hydraulically communicatively couple the inlet to the outlet, the fluid path comprising a nozzle having a diameter in a first range of 600 micrometers to 700 micrometers; a plunger positioned in the fluid path proximate the nozzle; and a piezoelectric material mechanically communicatively coupled to the plunger, a position of the plunger relative to the nozzle dependent on at least one dimension of the piezoelectric material, the at least one dimension of the piezoelectric material responsive to one or more electrical signals from an electrical system, wherein: when in operation the electrical system provides no electrical power to the piezoelectric material, the plunger is urged against the nozzle to interrupt a flow of a hydraulic fluid along the fluid path, the urging sufficient to interrupt flow at a fluid pressure of at least 700 pounds per square inch (psi); and when in operation the electrical system provides an electrical power to the piezoelectric material, the plunger is displaced from the nozzle to form a gap between the plunger and the nozzle to allow the flow of the hydraulic fluid along the fluid path, the gap proportional to the electrical power provided to the piezoelectric material, the plunger displacement in a second range of 40 micrometers to 70 micrometers, the gap sufficient to accommodate a flow rate of the hydraulic fluid of up to 0.5 liters per minute (lpm).

Example 2: The miniaturized hydraulic valve of Example 1, wherein the valve body includes, or is manufactured from, aluminum.

Example 3: The miniaturized hydraulic valve of Example 1, wherein the valve body is cylindrical in shape.

Example 4: The miniaturized hydraulic valve of Example 3, wherein at least a portion of the volume of the piezoelectric material is a cylindrical sleeve.

Example 5: The miniaturized hydraulic valve of Example 1, wherein at least a portion of the valve body is formed by one of an assembly from multiple elements, a casting, a mold, a 3D-printing, or a machining from a solid cylinder.

Example 6: The miniaturized hydraulic valve of Example 1, wherein the hydraulic fluid is an oil.

Example 7: The miniaturized hydraulic valve of Example 6, wherein the oil is a peanut oil having a viscosity in a range of 60 centistokes to 80 centistokes.

Example 8: The miniaturized hydraulic valve of Example 1, wherein each of the inlet and the outlet comprise a respective through hole able to receive a respective hydraulic fitting, the hydraulic fitting fluidly coupleable to a hydraulic hose.

Example 9: The miniaturized hydraulic valve of Example 1, wherein the plunger includes a gasket, and wherein the urging of the plunger against the nozzle to interrupt a flow of a hydraulic fluid along the fluid path includes an urging of the gasket against the nozzle.

Example 10: The miniaturized hydraulic valve of Example 9, wherein the gasket includes polytetrafluoroethylene (PTFE).

Example 11: The miniaturized hydraulic valve of Example 1, wherein the electrical system is operable to receive an electrical signal to cause an electrically controlled activation of the piezoelectric material to open the aperture.

Example 12: The miniaturized hydraulic valve of Example 11, wherein the electrically controlled activation of the piezoelectric material includes an expansion of the piezoelectric material.

Example 13: The miniaturized hydraulic valve of Example 11, wherein the electrically controlled activation of the piezoelectric material includes a contraction of the piezoelectric material.

Example 14: The miniaturized hydraulic valve of Example 13, wherein the contraction of the piezoelectric material is amplified.

Example 15: The miniaturized hydraulic valve of Example 14, wherein the piezoelectric material is an ellipsoid.

Example 16: The miniaturized hydraulic valve of Example 1, wherein the piezoelectric material includes lead zirconate titanate.

Example 17: A hydraulic system comprising: a miniaturized hydraulic valve, the miniaturized hydraulic valve comprising: a valve body, the valve body comprising an inlet and an outlet; a fluid path through the valve body, the fluid path able to hydraulically communicatively couple the inlet to the outlet, the fluid path comprising a nozzle having a diameter in a first range of 600 micrometers to 700 micrometers; a plunger positioned in the fluid path proximate the nozzle; and a piezoelectric material mechanically communicatively coupled to the plunger; and an electrical system electrically communicatively coupled to the piezoelectric material, at least one dimension of the piezoelectric material responsive to one or more electrical signals from the electrical system and a position of the plunger relative to the nozzle dependent on the at least one dimension of the piezoelectric material, wherein: when in operation the electrical system provides no electrical power to the piezoelectric material, the plunger is urged against the nozzle to interrupt a flow of a hydraulic fluid along the fluid path, the urging sufficient to interrupt flow at a fluid pressure of at least 700 pounds per square inch (psi); and when in operation the electrical system provides an electrical power to the piezoelectric material, the plunger is displaced from the nozzle to form a gap between the plunger and the nozzle to allow the flow of the hydraulic fluid along the fluid path, the gap proportional to the electrical power provided to the piezoelectric material, the plunger displacement in a second range of 40 micrometers to 70 micrometers, the gap sufficient to accommodate a flow rate of the hydraulic fluid of up to 0.5 liters per minute (lpm).

Example 18: The hydraulic system of Example 17, further comprising a hydraulic pump, an accumulator, a reservoir, and at least one hydraulic hose.

Example 19: The hydraulic system of Example 17, wherein the valve body includes, or is manufactured from, aluminum.

Example 20: The hydraulic system of Example 17, wherein the valve body is cylindrical in shape.

Example 21: The hydraulic system of Example 20, wherein at least a portion of the volume of the piezoelectric material is a cylindrical sleeve.

Example 22: The hydraulic system of Example 17, wherein at least a portion of the valve body is formed by one of an assembly from multiple elements, a casting, a mold, a 3D-printing, or a machining from a solid cylinder.

Example 23: The hydraulic system of Example 17, wherein the hydraulic fluid is an oil.

Example 24: The hydraulic system of Example 23, wherein the oil is a peanut oil having a viscosity in a range of 60 centistokes to 80 centistokes.

Example 25: The hydraulic system of Example 17, wherein each of the inlet and the outlet comprise a respective through hole able to receive a respective hydraulic fitting, the hydraulic fitting fluidly coupleable to a hydraulic hose.

Example 26: The hydraulic system of Example 17, wherein the plunger includes a gasket, and wherein the urging of the plunger against the nozzle to interrupt a flow of a hydraulic fluid along the fluid path includes an urging of the gasket against the nozzle.

Example 27: The hydraulic system of Example 26, wherein the gasket includes polytetrafluoroethylene (PTFE).

Example 28: The hydraulic system of Example 17, wherein the electrical system is operable to receive an electrical signal to cause an electrically controlled activation of the piezoelectric material to open the aperture.

Example 29: The hydraulic system of Example 28, wherein the electrically controlled activation of the piezoelectric material includes an expansion of the piezoelectric material.

Example 30: The hydraulic system of Example 28, wherein the electrically controlled activation of the piezoelectric material includes a contraction of the piezoelectric material.

Example 31: The hydraulic system of Example 30, wherein the contraction of the piezoelectric material is amplified.

Example 32: The hydraulic system of Example 31, wherein the piezoelectric material is an ellipsoid.

Example 33: The hydraulic system of Example 17, wherein the piezoelectric material includes lead zirconate titanate.

Example 34: A robotic arm comprising: a hydraulic control system physically coupled to the robot body; a hydraulically-actuated component physically coupled to the robot body, the hydraulically-actuated component operable to cause a motion of at least a portion of the robot; and a hydraulic assembly comprising: a miniaturized hydraulic valve, the miniaturized hydraulic valve comprising: a valve body, the valve body comprising an inlet and an outlet; a fluid path through the valve body, the fluid path able to hydraulically communicatively couple the inlet to the outlet, the fluid path comprising a nozzle having a diameter in a first range of 600 micrometers to 700 micrometers; a plunger positioned in the fluid path proximate the nozzle; and a piezoelectric material mechanically communicatively coupled to the plunger; and an electrical system electrically communicatively coupled to the piezoelectric material, at least one dimension of the piezoelectric material responsive to one or more electrical signals from the electrical system and a position of the plunger relative to the nozzle dependent on the at least one dimension of the piezoelectric material, wherein: when in operation the electrical system provides no electrical power to the piezoelectric material, the plunger is urged against the nozzle to interrupt a flow of a hydraulic fluid along the fluid path, the urging sufficient to interrupt flow at a fluid pressure of at least 700 pounds per square inch (psi); and when in operation the electrical system provides an electrical power to the piezoelectric material, the plunger is displaced from the nozzle to form a gap between the plunger and the nozzle to allow the flow of the hydraulic fluid along the fluid path, the gap proportional to the electrical power provided to the piezoelectric material, the plunger displacement in a second range of 40 micrometers to 70 micrometers, the gap sufficient to accommodate a flow rate of the hydraulic fluid of up to 0.5 liters per minute (lpm).

Example 35: The robotic arm of Example 34, wherein the valve body includes, or is manufactured from, aluminum.

Example 36: The robotic arm of Example 34, wherein the valve body is cylindrical in shape.

Example 37: The robotic arm of Example 36, wherein at least a portion of the volume of the piezoelectric material is a cylindrical sleeve.

Example 38: The robotic arm of Example 34, wherein at least a portion of the valve body is formed by one of an assembly from multiple elements, a casting, a mold, a 3D-printing, or a machining from a solid cylinder.

Example 39: The robotic arm of Example 34, wherein the hydraulic fluid is an oil.

Example 40: The robotic arm of Example 39, wherein the oil is a peanut oil having a viscosity in a range of 60 centistokes to 80 centistokes.

Example 41: The robotic arm of Example 34, wherein each of the inlet and the outlet comprise a respective through hole able to receive a respective hydraulic fitting, the hydraulic fitting fluidly coupleable to a hydraulic hose.

Example 42: The robotic arm of Example 34, wherein the plunger includes a gasket, and wherein the urging of the plunger against the nozzle to interrupt a flow of a hydraulic fluid along the fluid path includes an urging of the gasket against the nozzle.

Example 43: The robotic arm of Example 42, wherein the gasket includes polytetrafluoroethylene (PTFE).

Example 44: The robotic arm of Example 34, wherein the electrical system is operable to receive an electrical signal to cause an electrically controlled activation of the piezoelectric material to open the aperture.

Example 45: The robotic arm of Example 44, wherein the electrically controlled activation of the piezoelectric material includes an expansion of the piezoelectric material.

Example 46: The robotic arm of Example 44, wherein the electrically controlled activation of the piezoelectric material includes a contraction of the piezoelectric material.

Example 47: The robotic arm of Example 46, wherein the contraction of the piezoelectric material is amplified.

Example 48: The robotic arm of Example 47, wherein the piezoelectric material is an ellipsoid.

Example 49: The robotic arm of Example 34, wherein the piezoelectric material includes lead zirconate titanate.

Example 50: A robot comprising: a robot body; a hydraulic control system physically coupled to the robot body; a hydraulically-actuated component physically coupled to the robot body, the hydraulically-actuated component operable to cause a motion of at least a portion of the robot; and a hydraulic assembly comprising: a miniaturized hydraulic valve, the miniaturized hydraulic valve comprising: a valve body, the valve body comprising an inlet and an outlet; a fluid path through the valve body, the fluid path able to hydraulically communicatively couple the inlet to the outlet, the fluid path comprising a nozzle having a diameter in a first range of 600 micrometers to 700 micrometers; a plunger positioned in the fluid path proximate the nozzle; and a piezoelectric material mechanically communicatively coupled to the plunger; and an electrical system electrically communicatively coupled to the piezoelectric material, at least one dimension of the piezoelectric material responsive to one or more electrical signals from the electrical system and a position of the plunger relative to the nozzle dependent on the at least one dimension of the piezoelectric material, wherein: when in operation the electrical system provides no electrical power to the piezoelectric material, the plunger is urged against the nozzle to interrupt a flow of a hydraulic fluid along the fluid path, the urging sufficient to interrupt flow at a fluid pressure of at least 700 pounds per square inch (psi); and when in operation the electrical system provides an electrical power to the piezoelectric material, the plunger is displaced from the nozzle to form a gap between the plunger and the nozzle to allow the flow of the hydraulic fluid along the fluid path, the gap proportional to the electrical power provided to the piezoelectric material, the plunger displacement in a second range of 40 micrometers to 70 micrometers, the gap sufficient to accommodate a flow rate of the hydraulic fluid of up to 0.5 liters per minute (lpm).

Example 51: The robot of Example 50, wherein the valve body includes, or is manufactured from, aluminum.

Example 52: The robot of Example 50, wherein the valve body is cylindrical in shape.

Example 53: The robot of Example 52, wherein at least a portion of the volume of the piezoelectric material is a cylindrical sleeve.

Example 54: The robot of Example 50, wherein at least a portion of the valve body is formed by one of an assembly from multiple elements, a casting, a mold, a 3D-printing, or a machining from a solid cylinder.

Example 55: The robot of Example 50, wherein the hydraulic fluid is an oil.

Example 56: The robot of Example 55, wherein the oil is a peanut oil having a viscosity in a range of 60 centistokes to 80 centistokes.

Example 57: The robot of Example 50, wherein each of the inlet and the outlet comprise a respective through hole able to receive a respective hydraulic fitting, the hydraulic fitting fluidly coupleable to a hydraulic hose.

Example 58: The robot of Example 50, wherein the plunger includes a gasket, and wherein the urging of the plunger against the nozzle to interrupt a flow of a hydraulic fluid along the fluid path includes an urging of the gasket against the nozzle.

Example 59: The robot of Example 58, wherein the gasket includes polytetrafluoroethylene (PTFE).

Example 60: The robot of Example 50, wherein the electrical system is operable to receive an electrical signal to cause an electrically controlled activation of the piezoelectric material to open the aperture.

Example 61: The robot of Example 60, wherein the electrically controlled activation of the piezoelectric material includes an expansion of the piezoelectric material.

Example 62: The robot of Example 60, wherein the electrically controlled activation of the piezoelectric material includes a contraction of the piezoelectric material.

Example 63: The robot of Example 62, wherein the contraction of the piezoelectric material is amplified.

Example 64: The robot of Example 63, wherein the piezoelectric material is an ellipsoid.

Example 65: The robot of Example 50, wherein the piezoelectric material includes lead zirconate titanate.

Example 66: An electrohydraulic valve comprising: a valve manifold having an inlet port and an outlet port; a valve housing having a common chamber defined therein, a metering port in communication with the common chamber, and a first end coupled to the valve manifold; a first nozzle in fluid communication with the inlet port, the first nozzle having a first nozzle tip portion disposed within the common chamber, the first nozzle tip portion including a first orifice; a second nozzle in fluid communication with the outlet port, the second nozzle having a second nozzle tip portion disposed within the common chamber, the second nozzle tip portion including a second orifice; a first valve plug disposed within the common chamber and positioned in opposing relation to the first orifice; a first valve actuator coupled to the first valve plug and operable to move the first valve plug between a closed position in which the first valve plug contacts the first nozzle tip portion and closes the first orifice and an open position in which the first valve plug is offset from the first nozzle tip portion and a first gap is created between the first valve plug and the first orifice for passage of fluid from the first orifice to the common chamber; a second valve plug disposed within the common chamber and positioned in opposing relation to the second orifice; and a second valve actuator coupled to the second valve plug and operable to move the second valve plug between a closed position in which the second valve plug contacts the second nozzle tip portion and closes the second orifice and an open position in which the second valve plug is offset from the second nozzle tip portion and a second gap is created between the second valve plug and the second orifice for passage of fluid from the common chamber to the second orifice.

Example 67: An electrohydraulic valve according to Example 66, wherein the first valve actuator comprises a first piezo actuator having a first piezo element and a first flexure element, and wherein the first flexure element is coupled to the first valve plug.

Example 68: An electrohydraulic valve according to Example 67, wherein the second valve actuator comprises a second piezo actuator having a second piezo element and a second flexure element, and wherein the second flexure element is coupled to the second valve plug.

Example 69: An electrohydraulic valve according to Example 68, wherein the second valve actuator comprises a third piezo actuator having a third piezo element and a third flexure element, and wherein the third flexure element is coupled to the second flexure element.

Example 70: An electrohydraulic valve according to Example 66, wherein the valve housing comprises a valve body portion in which the common chamber is defined and a valve cap portion enclosing one end of the common chamber.

Example 71: An electrohydraulic valve according to Example 70, further comprising: a first stroke adjustment coupled to the first valve plug and operable to adjust a position of the first valve plug relative to the first nozzle tip portion; and a second stroke adjustment coupled to the second valve plug and operable to adjust a position of the second valve plug relative to the second nozzle tip portion.

Example 72: An electrohydraulic valve according to Example 71, wherein the first stroke adjustment comprises a first adjustment head coupled to the first valve plug and a first adjusting screw threadedly coupled to the first adjustment head, and wherein rotation of the first adjusting screw causes translation of the first adjustment head along the first adjusting screw.

Example 73: An electrohydraulic valve according to Example 72, wherein the first adjusting screw is rotatably coupled to the valve cap and axially restrained relative to the valve cap.

Example 74: An electrohydraulic valve according to Example 72, wherein the first valve actuator comprises a first piezo actuator having a first piezo element and a first flexure element, and wherein the first flexure element is coupled at a first end to the first valve plug and at a second end to the first adjustment head.

Example 75: An electrohydraulic valve according to Example 72, wherein the second stroke adjustment comprises a second adjustment head coupled to the second valve plug and a second adjusting screw threadedly coupled to the second adjustment head, and wherein rotation of the second adjusting screw causes translation of the second adjustment head along the second adjusting screw.

Example 76: An electrohydraulic valve according to Example 75, wherein the second adjustment screw is rotatably coupled to the valve cap and axially restrained relative to the valve cap.

Example 77: An electrohydraulic valve according to Example 75, wherein the second valve actuator comprises at least one piezo actuator having a piezo element and a flexure element, wherein the flexure element is coupled at a first side to the second valve plug and coupled at a second side to the second adjustment head.

Example 78: An electrohydraulic valve according to Example 75, wherein the second valve actuator comprises a first piezo actuator having a first piezo element and a first flexure element, wherein the second valve actuator comprises a second piezo actuator having a second piezo element and a second flexure element, wherein the first flexure element is coupled at a first side to the second valve plug and at a second side to a first side of the second flexure element, and wherein the second flexure element is coupled at a second side to the second adjustment head.

Example 79: An electrohydraulic valve according to Example 75, wherein the first adjustment head is received within a first bore formed in the valve cap portion and is movable axially within the first bore in response to rotation of the first adjusting screw, and wherein the second adjustment head is received within a second bore formed in the valve cap portion and is movable axially within the second bore in response to rotation of the first adjusting screw.

Example 80: An electrohydraulic valve of Example 70, further comprising a pressure transducer coupled to the valve cap portion and an opening in the valve cap portion forming a pressure communication path between the pressure transducer and the common chamber.

Example 81: An electrohydraulic valve of Example 70, further comprising an electrical feedthrough coupled to the valve cap portion and electrically connected to the first valve actuator and the second valve actuator within the common chamber.

Example 82: An electrohydraulic valve of Example 81, wherein the metering port is formed in the valve cap portion and includes a fitting for connection of a hydraulic fluid line.

Example 83: An electrohydraulic valve according to Example 66, wherein the valve manifold comprises a first bore connected to the inlet port and a second bore connected to the outlet port, wherein the first nozzle is mounted within the first bore with the first nozzle tip portion projecting into the common chamber, and wherein the second nozzle is mounted within the second bore with the second nozzle tip portion projecting into the common chamber.

Example 84: An electrohydraulic valve according to Example 66, wherein a portion of the first valve plug positioned in opposing relation to the first orifice comprises a first seal member, and wherein a portion of the second valve plug positioned in opposing relation to the second orifice comprises a second seal member.

Example 85: A method of operating a hydraulic actuator comprising: applying an electrical field to a first valve actuator disposed within a common chamber of a valve unit to axially displace a first valve plug disposed within the common chamber from a first orifice connected to an inlet port of a valve manifold and form a first communication path between the inlet port and the common chamber through the first orifice; delivering fluid to the common chamber through the first communication path from a fluid source connected to the inlet port; delivering the fluid from the common chamber to a hydraulic actuator through a metering port of the valve unit; removing the electrical field from the first valve actuator to bias the first valve plug against the first orifice and close the first communication path; applying an electrical field to a second valve actuator disposed within the common chamber of the valve unit to axially displace a second valve plug disposed within the common chamber from a second orifice connected to an outlet port of the valve manifold and form a second communication path between the outlet port and the common chamber through the second orifice; and exhausting fluid from the common chamber through the second communication path to a fluid return connected to the outlet port.

The invention claimed is:

1. An electrohydraulic valve comprising:
a valve manifold having an inlet port and an outlet port;
a valve housing having a common chamber defined therein, a metering port in communication with the common chamber, and a first end coupled to the valve manifold;
a first nozzle in fluid communication with the inlet port, the first nozzle having a first nozzle tip portion disposed within the common chamber, the first nozzle tip portion including a first orifice;
a second nozzle in fluid communication with the outlet port, the second nozzle having a second nozzle tip portion disposed within the common chamber, the second nozzle tip portion including a second orifice;

a first valve plug disposed within the common chamber and positioned in opposing relation to the first orifice;

a first valve actuator coupled to the first valve plug and operable to move the first valve plug between a closed position in which the first valve plug contacts the first nozzle tip portion and closes the first orifice and an open position in which the first valve plug is offset from the first nozzle tip portion and a first gap is created between the first valve plug and the first orifice for passage of fluid from the first orifice to the common chamber;

a second valve plug disposed within the common chamber and positioned in opposing relation to the second orifice;

a second valve actuator coupled to the second valve plug and operable to move the second valve plug between a closed position in which the second valve plug contacts the second nozzle tip portion and closes the second orifice and an open position in which the second valve plug is offset from the second nozzle tip portion and a second gap is created between the second valve plug and the second orifice for passage of fluid from the common chamber to the second orifice; and a first stroke adjustment coupled to the first valve plug and operable to adjust a position of the first valve plug relative to the first nozzle tip portion, wherein the first stroke adjustment comprises a first adjustment head coupled to the first valve plug and a first adjusting screw threadedly coupled to the first adjustment head, wherein rotation of the first adjusting screw causes translation of the first adjustment head along the first adjusting screw; and wherein the first valve actuator comprises a first piezo actuator having a first piezo element and a first flexure element, and wherein the first flexure element is coupled at a first end to the first valve plug and at a second end to the first adjustment head.

2. The electrohydraulic valve of claim 1, wherein the second valve actuator comprises a second piezo actuator having a second piezo element and a second flexure element, and wherein the second flexure element is coupled to the second valve plug.

3. The electrohydraulic valve of claim 2, wherein the second valve actuator comprises a third piezo actuator having a third piezo element and a third flexure element, and wherein the third flexure element is coupled to the second flexure element.

4. The electrohydraulic valve of claim 1, wherein the valve housing comprises a valve body portion in which the common chamber is defined and a valve cap portion enclosing one end of the common chamber.

5. The electrohydraulic valve of claim 4, further comprising:
a second stroke adjustment coupled to the second valve plug and operable to adjust a position of the second valve plug relative to the second nozzle tip portion.

6. The electrohydraulic valve of claim 5, wherein the second stroke adjustment comprises a second adjustment head coupled to the second valve plug and a second adjusting screw threadedly coupled to the second adjustment head, and wherein rotation of the second adjusting screw causes translation of the second adjustment head along the second adjusting screw.

7. The electrohydraulic valve of claim 6, wherein the second adjusting screw is rotatably coupled to the valve cap portion and axially restrained relative to the valve cap portion.

8. The electrohydraulic valve of claim 6, wherein the second valve actuator comprises at least one piezo actuator having a piezo element and a flexure element, wherein the flexure element of the at least one piezo actuator is coupled at a first side to the second valve plug and coupled at a second side to the second adjustment head.

9. The electrohydraulic valve of claim 6, wherein the second valve actuator comprises a first piezo actuator having a first piezo element and a first flexure element, wherein the second valve actuator comprises a second piezo actuator having a second piezo element and a second flexure element, wherein the first flexure element of the first piezo actuator of the second valve actuator is coupled at a first side to the second valve plug and at a second side to a first side of the second flexure element of the second piezo actuator of the second valve actuator, and wherein the second flexure element of the second piezo actuator of the second valve actuator is coupled at a second side to the second adjustment head.

10. The electrohydraulic valve of claim 6, wherein the first adjustment head is received within a first bore formed in the valve cap portion and is movable axially within the first bore in response to rotation of the first adjusting screw, and wherein the second adjustment head is received within a second bore formed in the valve cap portion and is movable axially within the second bore in response to rotation of the second adjusting screw.

11. The electrohydraulic valve of claim 4, wherein the first adjusting screw is rotatably coupled to the valve cap portion and axially restrained relative to the valve cap portion.

12. The electrohydraulic valve of claim 4, further comprising a pressure transducer coupled to the valve cap portion and an opening in the valve cap portion forming a pressure communication path between the pressure transducer and the common chamber.

13. The electrohydraulic valve of claim 4, further comprising an electrical feedthrough coupled to the valve cap portion and electrically connected to the first valve actuator and the second valve actuator within the common chamber.

14. The electrohydraulic valve of claim 13, wherein the metering port is formed in the valve cap portion and includes a fitting for connection of a hydraulic fluid line.

15. The electrohydraulic valve of claim 1, wherein the valve manifold comprises a first bore connected to the inlet port and a second bore connected to the outlet port, wherein the first nozzle is mounted within the first bore with the first nozzle tip portion projecting into the common chamber, and wherein the second nozzle is mounted within the second bore with the second nozzle tip portion projecting into the common chamber.

16. The electrohydraulic valve of claim 1, wherein a portion of the first valve plug positioned in opposing relation to the first orifice comprises a first seal member, and wherein a portion of the second valve plug positioned in opposing relation to the second orifice comprises a second seal member.

* * * * *